(12) United States Patent
Kadaba

(10) Patent No.: US 7,278,568 B2
(45) Date of Patent: Oct. 9, 2007

(54) MAIL SORTING SYSTEMS AND METHODS

(75) Inventor: Nagesh Kadaba, Roswell, GA (US)

(73) Assignee: United Parcel Service of America, Inc.

( * ) Notice: Subject to any disclaimer, the term of this patent is extended or adjusted under 35 U.S.C. 154(b) by 265 days.

(21) Appl. No.: 11/173,240

(22) Filed: Jul. 1, 2005

(65) Prior Publication Data

US 2007/0000989 A1 Jan. 4, 2007

(51) Int. Cl.
*G06K 19/06* (2006.01)

(52) U.S. Cl. ...................... 235/375; 235/492

(58) Field of Classification Search ............... 235/375, 235/492, 380, 382, 382.5, 385; 209/900, 209/584; 271/3.13
See application file for complete search history.

(56) References Cited

U.S. PATENT DOCUMENTS

| | | | |
|---|---|---|---|
| 3,438,489 A | 4/1969 | Cambornac et al. | |
| 4,832,204 A | 5/1989 | Handy et al. | |
| 5,051,914 A | 9/1991 | Samsone et al. | |
| 5,068,797 A | 11/1991 | Samsone et al. | |
| 5,072,401 A | 12/1991 | Samsone et al. | |
| 5,421,464 A * | 6/1995 | Gillmann et al. | 209/584 |
| 5,472,097 A | 12/1995 | Villachica | |
| 5,612,889 A | 3/1997 | Pintsov et al. | |
| 5,684,705 A | 11/1997 | Herbert | |
| 5,770,841 A | 6/1998 | Moed et al. | |
| 5,778,377 A | 7/1998 | Marlin et al. | |
| 5,869,819 A | 2/1999 | Knowles et al. | |
| 5,936,865 A | 8/1999 | Pintsov et al. | |
| 5,971,587 A | 10/1999 | Kato et al. | |
| 6,047,264 A | 4/2000 | Fisher et al. | |
| 6,134,561 A | 10/2000 | Brandien et al. | |
| 6,220,509 B1 | 4/2001 | Byford | |
| 6,285,916 B1 | 9/2001 | Kadaba et al. | |

(Continued)

FOREIGN PATENT DOCUMENTS

EP 0 710 930 A2 8/1996

(Continued)

OTHER PUBLICATIONS

International Search Report from corresponding International Application No. PCT/US2006/023946 dated Nov. 23, 2006.

*Primary Examiner*—Thien Minh Le
(74) *Attorney, Agent, or Firm*—Alston & Bird LLP

(57) ABSTRACT

Systems and methods are disclosed for sorting and tracking mail items that are sent via a mail system. Such systems improve the efficiency and accuracy of mail systems by utilizing radio frequency identification (RFID) technology to communicate sorting instructions to a sorting operator. In one embodiment, a radio frequency reader device or tag can be associated with each container used to hold a plurality of mail items destined for a common delivery location. By reading information stored on RFID tags associated with mail items to be sorted, the radio frequency reader devices can be configured to automatically alert a sorting operator as to whether a mail item belongs in a selected container. The reader devices can also maintain a record of what mail items have been placed in each such container. This information can be stored in association with tracking information that is generated during the transport of the containers.

23 Claims, 25 Drawing Sheets

U.S. PATENT DOCUMENTS

| | | |
|---|---|---|
| 6,335,685 B1 | 1/2002 | Schrott et al. |
| 6,370,446 B1 | 4/2002 | Divine |
| 6,385,504 B1 | 5/2002 | Pintsov et al. |
| 6,463,354 B1 | 10/2002 | Pintsov |
| 6,557,758 B1 | 5/2003 | Monico |
| 6,610,954 B2 | 8/2003 | Takizawa |
| 6,721,617 B2 | 4/2004 | Kato et al. |
| 6,727,813 B2* | 4/2004 | Iwasaki et al. ............. 340/531 |
| 6,786,404 B1 | 9/2004 | Bonner et al. |
| 6,853,294 B1* | 2/2005 | Ramamurthy et al. ..... 340/10.1 |
| 7,030,760 B1 | 4/2006 | Brown |
| 7,142,092 B2* | 11/2006 | Ramamurthy et al. ..... 340/10.1 |
| 2001/0013830 A1 | 8/2001 | Garber et al. |
| 2001/0052544 A1 | 12/2001 | Nishitani |
| 2002/0175112 A1 | 11/2002 | Takizawa |
| 2003/0014143 A1 | 1/2003 | Kato et al. |
| 2003/0101069 A1 | 5/2003 | Sando |
| 2003/0106771 A1 | 6/2003 | Takizawa |
| 2003/0116480 A1 | 6/2003 | Takizawa |
| 2003/0116481 A1 | 6/2003 | Takizawa |
| 2003/0116484 A1 | 6/2003 | Takizawa |
| 2003/0126030 A1* | 7/2003 | Hungerford, III ............ 705/26 |
| 2004/0000997 A1* | 1/2004 | Stevens, III ............. 340/572.1 |
| 2004/0004119 A1 | 1/2004 | Baldassari et al. |
| 2004/0016684 A1 | 1/2004 | Braginsky et al. |
| 2004/0049315 A1 | 3/2004 | Sansone et al. |
| 2004/0049316 A1 | 3/2004 | Pintsov et al. |
| 2004/0069850 A1* | 4/2004 | De Wilde .................... 235/385 |
| 2004/0098272 A1 | 5/2004 | Kapsis et al. |
| 2004/0143354 A1 | 7/2004 | Kato et al. |
| 2004/0149826 A1 | 8/2004 | Alleshouse |
| 2004/0153379 A1 | 8/2004 | Joyce et al. |
| 2004/0193449 A1 | 9/2004 | Wildman et al. |
| 2004/0257203 A1 | 12/2004 | Maltsev et al. |
| 2004/0263901 A1 | 12/2004 | Critelli et al. |
| 2005/0040231 A1* | 2/2005 | Allison et al. ............. 235/385 |
| 2005/0099292 A1 | 5/2005 | Sajkowsky |
| 2005/0116034 A1 | 6/2005 | Satake et al. |
| 2005/0119786 A1 | 6/2005 | Kadaba |
| 2005/0232747 A1* | 10/2005 | Brackmann et al. ........ 414/803 |
| 2006/0071063 A1* | 4/2006 | Duckett ...................... 235/375 |
| 2006/0190588 A1* | 8/2006 | Nakayama et al. ......... 709/224 |
| 2007/0000989 A1* | 1/2007 | Kadaba ...................... 235/375 |
| 2007/0057789 A1* | 3/2007 | Hamerly et al. ......... 340/572.1 |

FOREIGN PATENT DOCUMENTS

| | | |
|---|---|---|
| EP | 0 710 930 A3 | 3/1997 |
| EP | 0928641 A1 | 7/1999 |
| EP | 1 246 133 A1 | 2/2002 |
| EP | 1 246 134 A1 | 2/2002 |
| EP | 1273359 A1 | 8/2003 |
| EP | 1 398 735 A2 | 3/2004 |
| WO | WO98/24036 | 6/1998 |
| WO | WO 00/00300 | 1/2000 |

* cited by examiner

| UPS | UPS Professional Services |

XXXXXXXXXX

| Main | Ship | Tools | Users | Admin | Links | Help |

[Address Book]

Ship From Information

Country   United States
Email Notification  [smcniff@alston.com]

Ship To Information

Personal Address Book [Select One ▶]
Company/Name      [           ]
Attention         [           ]
Addr Line1        [           ]   } RECIPIENT
Addr Line2        [           ]   ADDRESS DATA
Addr Line3        [           ]   212
City              [           ]
State or Province/Zip [       ]
Country           [United States ▶]
Email             [           ]
Phone             [           ]
Add To Personal Address Book ☐

[Ship]  [Resets]

Domestic Information

Service Level   [Next Day Air ▶]
Weight          [0]
Insured Value   [0]
Package Type    [UPS Letter ▶]
☐ Residential
☐ Saturday Delivery Client Number   [           ]
Matter Number   [           ]
Sender          [           ]

Please print and attach this receipt to your package

1804 — Thursday, September 25, 2003 5:37:47 PM

Package ID:

— 1806

JC663363564 — 1802

Service Level: Next Day Air
Reference Number1: 009990-030000
Reference Number2: John Doe 1804 — Shipper: Betty Sanders
Phone: 404-881-4602

Shipped To: Armstrong Teasdale LLP

MAIL SORTING SYSTEMS AND METHODS

BACKGROUND OF THE INVENTION

1. Field of the Invention

The present invention generally relates to sorting and tracking the movement of packages as they are transported both internally within an organization, and as they are shipped externally by a carrier on behalf of the organization. The invention also relates to providing notifications to interested parties as to the status of packages during transport.

2. Description of the Related Art

Within an organization, there is typically a significant amount of internal mail transferred between different office locations. Many organizations have a mailroom at each office location or business center, that acts as the central receiving point for mail, parcels, and other such items. These items will broadly be referred to as either 'mail' or 'packages.' The mail or packages are either received from workers within the office location to be sent out from such location (i.e., "outbound packages"), or can be received from an external carrier or other source for distribution to workers at the office location served by the mailroom (i.e., "inbound packages"). Many enterprises include a number of locations which are geographically remote from one another. In such organizations, it is commonplace for packages to be internally routed between workers within the same organization, but who are located at respective office locations that are geographically remote from one another.

Accordingly, such packages are effectively sent internally within the organization, although the services of an external carrier such as UPS®, Inc. may be used to transport the packages between locations. Some organizations have their own internal mail service to route mail or packages between different office locations, although this is relatively uncommon, particularly in cases in which the packages are shipped between offices that are geographically remote. In many enterprises, for local mail and packages, internal mail is sent using generic envelopes with handwritten "Send To" information. As a cost effective way of transferring mail between different organizational locations, some organizations ship packages destined for a common location in bulk via the services of an external carrier, such as UPS®, Inc.

A problem with these and other such internal mail systems is that they provide little or no "visibility" (i.e., tracking data) as to where an individual package is, or has been, during transport. This lack of visibility forces employees to choose between sending their package via the more economical internal mail system, which provides no information regarding a package's status, and sending the package by some other means, such as an external carrier, which can at least provide tracking data on the package as it travels from one location to another. As a result, employees often rely on overnight mail service to send their important internal documents. Unfortunately, this can be a relatively expensive solution in comparison to using the internal mail system, and it still does not provide the "desk-to-desk" visibility that would help avoid packages being lost or misplaced internally. It also provides limited or no ability for interested persons to be able to determine the status of a package, which may be desirable for various reasons. For example, the ability to determine that status of a package during transportation may be important to providing the ability to plan work schedules that are dependent upon arrival of the contents of the package or mail.

Such visibility may also provide an "audit trail" for establishing the whereabouts of a package during shipment. This may be important to determining where a package that has been delayed or lost is in the shipment process, which may be particularly important if the package contents are time-sensitive or subject to spoilage. The ability to track the mail or package can also be important from the standpoint of verifying that the package was in fact sent, which may be important in legal contexts such as for the purposes of providing notification of legal rights, or acceptance of or performance under a contract, for example. In addition, the ability to track a package or mail item provides a degree of oversight and accountability for those involved in the package or mail shipping process, because, in the event a package is lost, tracking ability provides insight into possible system or human errors leading to loss of the package. For at least these reasons, it would be desirable in many contexts to provide the ability to better track packages sent between office locations of an organization.

A solution is therefore needed to provide improved sorting and tracking capabilities for mail items that are processed by an internal mail system, even when an aspect of the internal mail system includes shipping such packages in bulk via an external carrier.

BRIEF SUMMARY OF THE INVENTION

The present invention is directed to a system for, and methods of, shipping intra-organizational mail in a relatively cost efficient manner, so that such mail can be sorted and tracked at the individual package level even though such items may be transported in bulk between organizational locations via an external carrier. Generally described, such systems and methods can improve the efficiency and accuracy of mail systems by utilizing radio frequency identification (RFID) technology to communicate sorting instructions to a sorting operator. Embodiments of the invention also allow senders to associate package identifiers with their respective mail items, which can then be associated with a tracking identifier associated with a container containing the mail items shipped in bulk via an external carrier from one organizational location to another.

In one embodiment, a system for sorting mail items is disclosed that includes: a plurality of radio frequency identification (RFID) tags, wherein each RFID tag is physically associated with a mail item to be delivered from a sender to a receiver; a plurality of containers, wherein each container is used for holding a plurality of mail items destined for a common delivery location; and a plurality of tag reader devices, wherein each tag reader device is physically associated with one of the plurality of containers, each tag reader device being configured to: read first information from the RFID tag associated with each mail item that is brought within range of the tag reader device; compare the first information from the tag with second information stored on the tag reader device; determine whether the mail item belongs in the associated container based on the comparing step; and generate an alert if the determining step indicates that the mail item does not belong in the associated container.

In another embodiment, a method for sorting mail items is disclosed that includes the steps of: associating a radio frequency identification tag with a mail item that is to be mailed from a sender to a receiver; associating a tag reader device with a container that is to be used for holding a plurality of mail items destined for a common delivery location; reading first information from the tag associated with the mail item when the mail item is brought within range of the tag reader device; comparing the first information from the tag with second information stored on the tag reader device; determining whether the mail item belongs in the container based on the comparing step; and generating an alert if the determining step indicates that the mail item does not belong in the container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 18 is a typical screen snapshot of a client shipping application used by the sender of a package to generate a package label including a package identifier in accordance with a preferred embodiment of the invention;

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
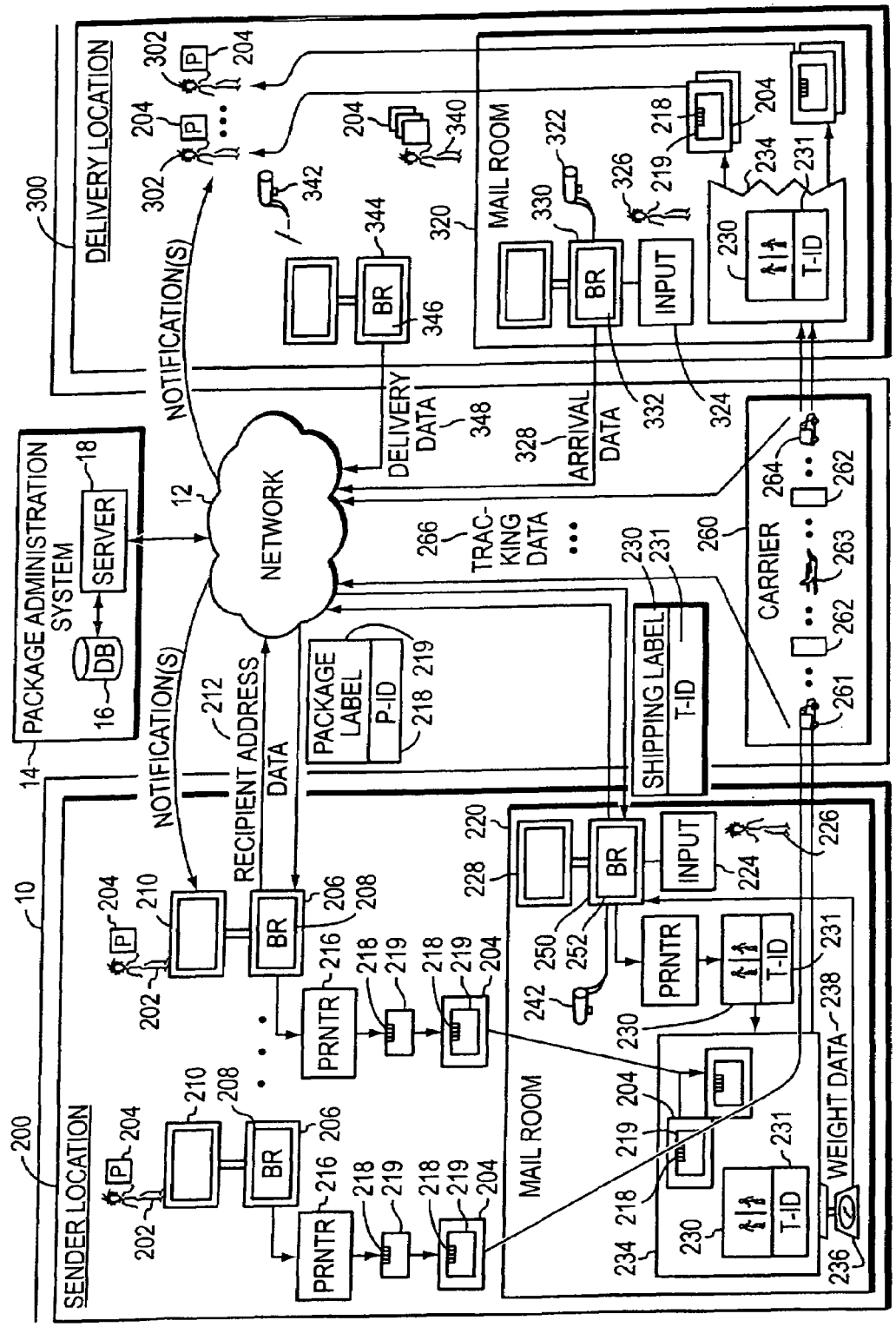
FIG. 1 is a block diagram of a system for tracking packages sent from a sender location to a delivery location in an aggregated master package in accordance with a preferred embodiment of the invention.

FIG. 1 is a block diagram of an embodiment of the current invention. Organization 10 has a plurality of different locations, as is typical of many enterprises. In the embodiment of FIG. 1, organization 10 includes a sender location 200 and a delivery location 300. At the sender location 200, at least one sender 202 carries out a process for sending an intra-organizational package 204 to a corresponding recipient 302 located in delivery location 300. The sender location 200 has at least one sender computer terminal 206. The computer terminal 206 can be connected to communicate with a package administration system 14 over a network 12. The network 12 can be the Internet or other public communication network, for example.

Running on the sender computer 206 is a web browser application 208, that allows a sender 202 to access the package administration system 14 over the network 12. Using the browser 208, the sender 202 can enter or select recipient address data 212 corresponding to a destination for respective package 204. Optionally, the sender 202 can enter data indicating the recipient's name, email address, telephone number, carrier account data, and package-related data such as weight, service level, insured value, and package type, for example. Jumping briefly to FIG. 18, a computer screen snapshot is shown, illustrating how, in one embodiment, a typical visual interface screen would appear to a sender 202 accessing the package administration system 14 using the browser 208, and viewing the results on a monitor 210 connected to receive output from the computer 206, for example. Returning to FIG. 1, The sender 202 can operate the sender computer 206, causing it to transmit recipient address data 212, and optionally other entered data, to the package administration system 14 over the network 12.

The package administration system 14 has the capability to generate a package identifier 218 for unique identification of the package 204. The package administration system 14 associates the package identifier 218 with the received recipient address data 212, and stores the information in a package administration system database 16. In a preferred embodiment, the package administration system 14 transmits a package label 219 with the package identifier 218 to the sender computer 206 via the network 12. However, one of ordinary skill in the art will readily recognize that the present invention does not require that the package identifier 218 be sent with the package label 219. In other words, the package identifier 218 could be sent from the package administration system 14 to the sender computer 206 alone, or in conjunction with yet other information besides the package label 219. In the preferred embodiment, the sender computer 206 receives the package label 219 with package identifier 218, and is connected to provide such data to the printer 216. The printer 216 receives the package label 219 including the package identifier 218 and other optional indicia from the sender computer 206, and produces such package label 219 on print media. For example, the package label 219 can be printed as ink or the like, and the print media can be paper, a pressure-sensitive adhesive label, etc., to which the printer fixes the package identifier, and other optional indicia. The sender 202 physically associates the printed package label 219 with package identifier 218 on the package 204, such as by affixing it with tape, adhesive, or otherwise applying it to the package 204. The sender 202 transports the package 204 with the associated package label 219 having package identifier 218 to a sender mailroom 220.

Figure 19:
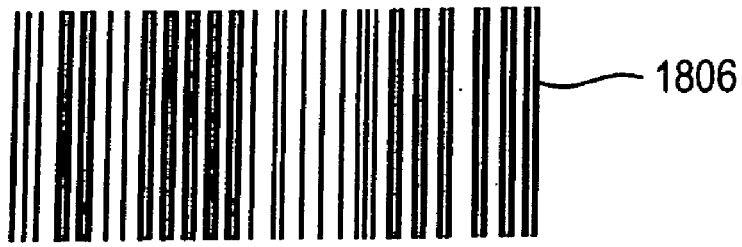
FIG. 19 is a typical example of a printed package label including a package identifier to be associated with a package in accordance with a preferred embodiment of the invention.

Jumping briefly to FIG. 19, a typical example of a package label 219 used in one embodiment of the present invention is shown. In this embodiment, package label 219 includes a human-readable version of a package identifier 1802, and other optional human-readable indicia 1804, such as date, time, service level, etc. The package label 219 shown in FIG. 19 also includes optical indicia in the form of a bar code 1806 capable of comprising at least the package identifier 218, and optionally other indicia. In another embodiment, the package label 219 can include electromagnetic media such as an RFID tag capable of storing a package identifier 218 and other optional indicia, for example.

Returning to FIG. 1, by using the recipient address data 212 associated with the package identifiers 218, a mailroom attendant 226 aggregates the packages 204 received in the sender mailroom 220 according to the package destination. This occurs so that all aggregated packages 204 having, for example, a common delivery location 300 can be shipped to the common delivery location within a consolidated master package 234. The sorting of packages 204 bound for a common destination can be carried out by hand, or can be computer-assisted. The packages 204 can be aggregated and shipped in a master package 234 on a regular basis, such as once each workday or once per work shift, for example. To facilitate this process, the mailroom attendant uses a web browser 252 running on a sender mailroom computer 250, which is coupled to communicate with the package administration system 14 via the network 12.

As the mailroom attendant 226 places aggregated packages 204 destined for common delivery location 300 in the master package 234, the mailroom attendant causes the package identifiers 218 of respective packages to be input to the sender mailroom computer 250. In a preferred embodiment, the respective package identifiers 218 are scanned into sender mailroom computer 250 using a scanning device 222, which is coupled to communicate with such computer. The scanning device 222 can include an optical reader capable of reading one- or two-dimensional optical indicia such as bar code labels, or it may include a device operable with electromagnetic media such as Radio Frequency Identification (RFID) tags. Alternatively, a mailroom attendant 226 can simply use eyesight to read and enter the package identifiers 218 into the sender mailroom computer 250 using an input device 224. This input device can be a keyboard, keypad, or other device.

Additionally, after all of the packages 204 having common delivery location 300 are placed in the master package 234, the master package can be placed on a scale 236, to generate weight data 238. The scale 236 can be coupled to communicate the weight data 238 to the sender mailroom computer 250. The sender mailroom computer 250 receives the weight data 238, and can be connected to communicate such data to the package administration system 14 for use in billing the organization 10 for shipment of the master package 234 from the sender location 200 to the delivery location 300.

Figure 20:
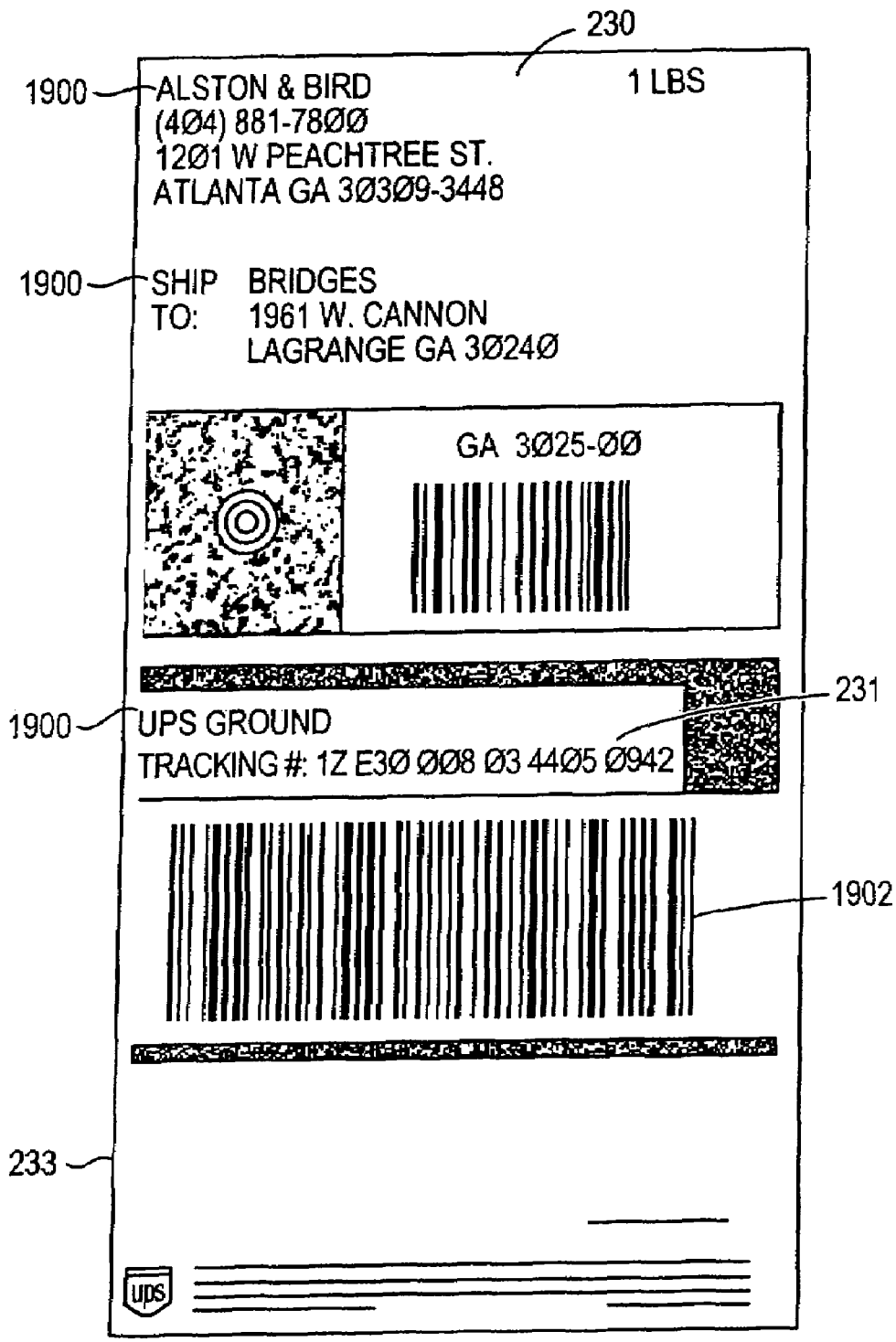
FIG. 20 is a typical example of a shipping label including a tracking identifier to be associated with a master package in accordance with a preferred embodiment of the invention.

The attendant 226 and/or sender mailroom computer 250 generates a request for a shipping label 230 with a tracking identifier 231. The request can include the package identifiers 218 for the packages to be included in the master package 234. The request for the shipping label 230 with tracking identifier 231 is transmitted from the computer 250 to the package administration system 14 via the network 12. The package administration system 14 receives the request and optional package identifiers 218, generates a shipping label 230 including a tracking identifier 231, optionally stores the package identifiers 218 in association with the tracking identifier 231, and transmits the shipping label with tracking identifier to the computer 250. The computer 250 receives the shipping label 230 with tracking identifier 231, and is operatively coupled to provide such shipping label with tracking identifier to the printer 232, which prints such shipping label with tracking identifier on print media 233. The print media 233 can be paper, a pressure-sensitive adhesive label, or other such media. For example, jumping briefly to FIG. 20, an embodiment of a typical shipping label 230 in accordance with the present invention is shown. In the embodiment of FIG. 20, the shipping label 230 is printed on an adhesive-backed label 233, and includes various human-readable indicia 1900, a human readable version of a tracking identifier 231, and a bar code 1902 capable of storing at least the tracking identifier 231 in an optical format. Returning to FIG. 1, a mailroom attendant 226 physically associates the media 233 bearing the printed shipping label 230 with tracking identifier 231 with the master package 234, such as by attaching it with tape, or if in the form of an adhesive-backed label, applying such label to the package, etc. The mailroom attendant 226 ships the master package 234 to the delivery location 300.

The master package 234 can be shipped via an external carrier 260. Additionally, although not required to implement the current invention, the package administration system 14 can be operated by the external carrier 260. As the carrier 260 transports the master package 234 from the sender location 200 to the delivery location 300, optical or electromagnetic scanners and computers internal to the carrier's logistics network scan the tracking identifier 231 on the master package 234, to generate tracking data 266 indicating the status of the master package during transport. For example, the tracking identifier 231 of the master package 234 can be scanned by such equipment at one or more of a number of different points, such as by a driver 261 who picks up the master package at the sender mailroom 220 and uses a hand-held scanning device to read the tracking identifier 231 from the master package 234, at hubs 262 that receive and sort the package and have equipment to scan the tracking identifier 231, and finally by the delivery driver 264 who delivers the package to the delivery mailroom 320 and uses a hand-held device to scan the tracking identifier 231 to generate tracking data 266 prior to delivery to the recipient 302.

The tracking data 266 can include data identifying the date, time, and/or place of particular events associated with the master package 234 as it is transported from the sender mailroom 220 to the delivery mailroom 320 within the carrier's logistics network. Such events can include the arrival or departure of the master package 234 at or from particular locations within the logistics network of the carrier 260 as the master package is transported. Such tracking data 266 can also include the identity of persons handling the package, such as the pickup or delivery driver, or a person acknowledging receipt of the package at a particular location by signing for the master package. The package administration system 14 can provide access to the tracking data 266 related to the master package 234 via the network 12, so that a sender 202, a recipient 302, and potentially others can determine the status of a package 204 during transportation, both inside and outside of the logistics network of the carrier 260.

The delivery location 300 has a delivery mailroom 320, which includes delivery mailroom computer 330 connected to communicate with the package administration system 14 via the network 12. Also provided in the sender mailroom 320 is an optical or electromagnetic scanning device 322 connected to communicate with the delivery mailroom computer 330. The master package 234 arrives at the delivery mailroom 320, and a mailroom attendant 326 scans the tracking identifier 231 using the scanning device 322 to generate arrival tracking data 328. After the master package 234 is opened, and the packages 204 contained therein are removed, the scanning device 322 and delivery mailroom computer 330 can generate additional arrival tracking data 328 by scanning package identifiers 218 associated with respective packages 204. For example, the scanning of the package identifiers 218 of packages 204 within the master package 234 can be performed to provide a record of the packages received at the delivery location, or it may be done to verify that the packages 204 indicated as being in the master package 234 were in fact present at the delivery location 300. Using a web browser application 332 running on the delivery mailroom computer 330, arrival tracking data 328 comprising the tracking identifier 231, and optionally also the package identifiers 218, can be received by the computer, and transmitted to the package administration system 14 over the network 12.

Subsequent to the arrival processing described above, delivery personnel 340 take the packages 204 from the delivery mailroom 320 and deliver them to corresponding recipients 302. Optionally, delivery tracking data 348, including approximate dates, times, places, and/or personnel involved in delivery of packages 204 at respective recipient locations, can be generated. In one embodiment, a portable scanning device 342 is used to generate delivery tracking data 348 by scanning the package identifier 218. This scanning device 342 may be wireless or otherwise coupled to communicate its data to the package administration system 14, whether directly or by an intermediate computer, such as units 330 or 344. In another embodiment, delivery personnel 340 simply make note of delivery tracking data. The delivery personnel 340 can accomplish this task by writing delivery tracking data 348 on a notepad, using an electronic data capture device (e.g., a personal digital assistant), or by preparing some other form of record, etc. for respective packages 204. Using a delivery location computer 344 executing a browser application 346, the delivery tracking data 348 can be input to computer 344 and transmitted to the package administration system 14 via the network 12. The package administration system 14 can store the delivery tracking data 348 in correspondence with the tracking identifier 231 to permit the sender and/or recipient to determine the status of a package 204.

Figure 2:
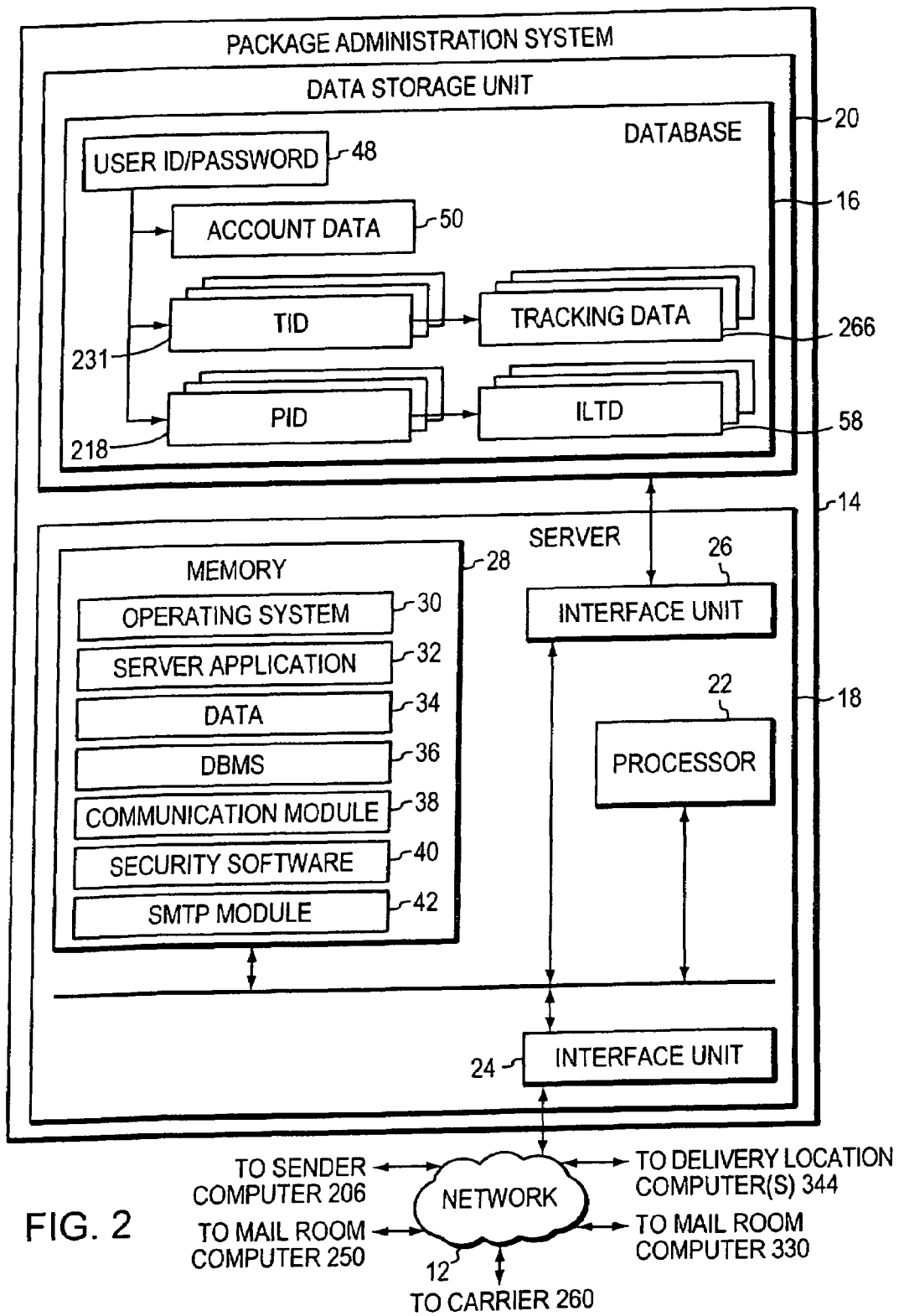
FIG. 2 is a block diagram of a package administration system for tracking packages in accordance with a preferred embodiment of the invention.

FIG. 2 shows a block diagram of a package administration system 14 in accordance with the invention depicted in FIG. 1. The package administration system 14 includes a server 18 having a processor 22, a first interface unit 24, a second interface unit 26, and memory 28. The memory 28 comprises a plurality of software applications executed by the processor 22 including an operating system 30 for controlling the allocation and usage of hardware resources, and a server application 32 for handling the server-side functionality of the package administration system. The memory 28 also includes a generic data storage area 34. Data storage area 34 can be used to provide temporary storage space needed for data required by the modules and applications executed by the server 18, for example. The memory 28 further comprises a database management system (DBMS) 36 for handling actions taken with respect to the package administration system database 16; a communication module 38 for handling communications to and from the server; security software 40 for performing user authentication and other security type services; and a simple mail transfer protocol (SMTP) module 42 to be used in one embodiment of the invention when sending and/or receiving email notifications over a network 12. The server 18 uses the first interface unit 24 to send and receive data over a network 12, while the second interface unit 26 is used to transfer data between the server 18 and a data storage unit 20, which also comprises part of the package administration system 14.

The data storage unit 20 includes a database 16. In one embodiment, the database 16 contains records of related data fields including user identification (ID) and password 48, and account data 50 associated with the user ID and password. If there is one or more master packages 234 associated with the user account, the database 16 can also contain a tracking identifier (TID) 231 associated with each such master package, as well as any tracking data 266 associated with the master package. The tracking data 266 can include data identifying the date, time, and/or place of particular events associated with the master package 234 as it is transported from a sender mailroom 220 to a delivery mailroom 320 within a carrier's logistics network. Such events can include the arrival or departure of the master package 234 at or from particular locations within the logistics network of the carrier 260 as the master package is transported. Such tracking data 266 can also include the identity of persons handling the package, such as the pickup or delivery driver, or a person acknowledging receipt of the package at a particular location by signing for the master package.

The database 16 can further comprise one or more package identifiers (PID) 218 associated with respective packages 204. Each package identifier 218 can optionally have intra-organizational location tracking data (ILTD) 58 associated with it. The ILTD 58 can include, for example, delivery tracking data 348 such as approximate dates, times, places, and/or personnel involved in delivery of packages 204 at respective recipient locations 302. When a package 204 associated with the user account is shipped in a master package 234, from a sender location 200 to a delivery location 300, the ILTD 58 can optionally include a pointer or a link to the tracking identifier 231 of the master package in which the package 204 was placed for shipment. In this way, visibility for such a package 204 includes both the ILTD 58 and the tracking data 266 as the package 204 travels from a sender 202 to a recipient 302.

Those skilled in the art will recognize that the functionality of the package administration system 14 as described in FIG. 2 may be carried out on a plurality of computers capable of communicating via a network such as the internet or other communication network, and, accordingly, need not be discussed here for an understanding of the subject invention. In other words, rather than have a single server 18 to perform the described functions, these functions can be executed by two or more distributed computers, and such modification is expressly contemplated to be within the scope of this invention.

Figure 3:
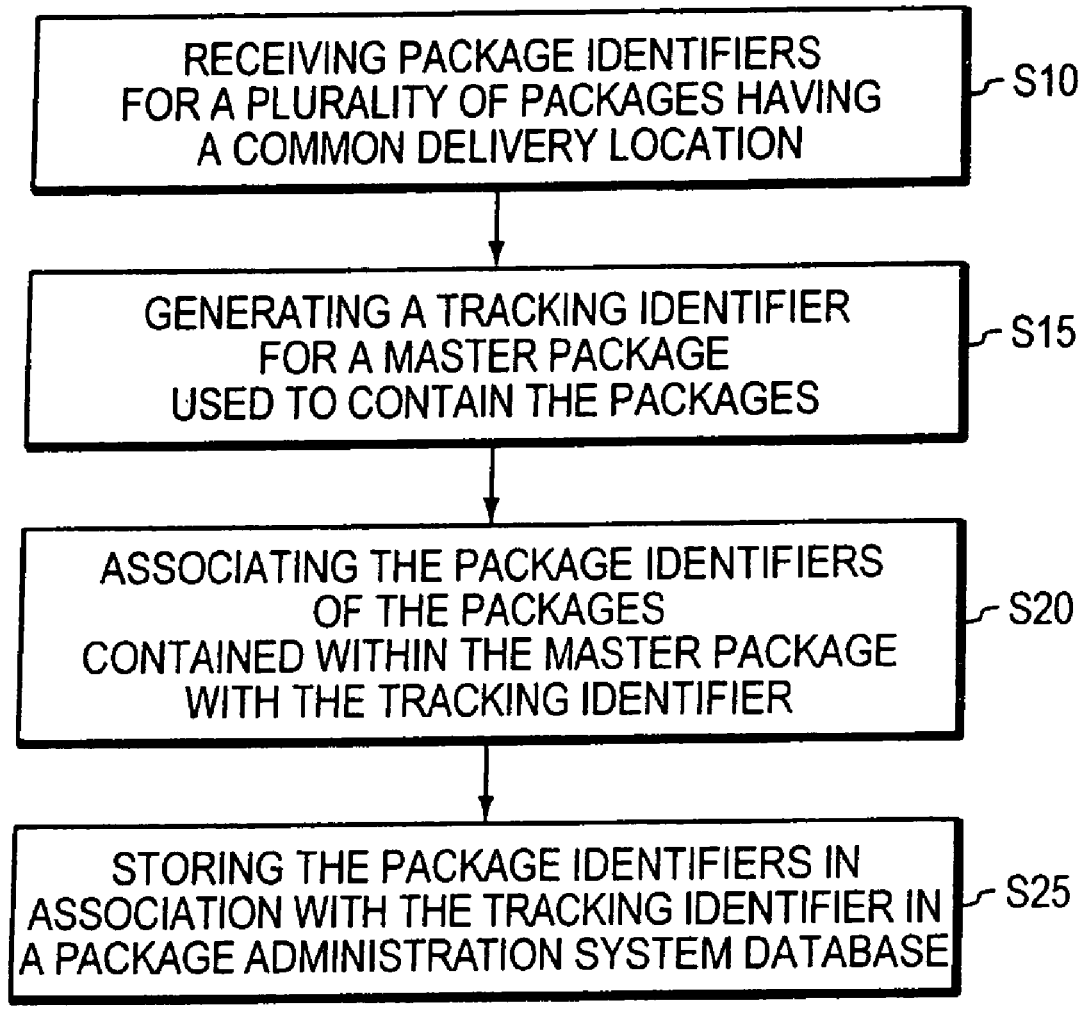
FIG. 3 is a flowchart of a general method for tracking packages using the package administration system in accordance with a preferred embodiment of the invention.

FIG. 3 shows a process that can be performed by the package administration system 14, or more specifically, the server 18 in combination with the database 16, in accordance with the present invention. At step S10, package identifiers 218 for a plurality of packages 204 having a common delivery location 300 are received. At step S15, a tracking identifier 231 is generated for a master package 234 used to contain the plurality of packages 204. At step S20, the package-identifiers 218 of the packages 204 contained within the master package 234 are associated with the tracking identifier 231. At step S25, the package identifiers 218 in association with the tracking identifier 231 are stored in a package administration system database 16.

Figure 4:
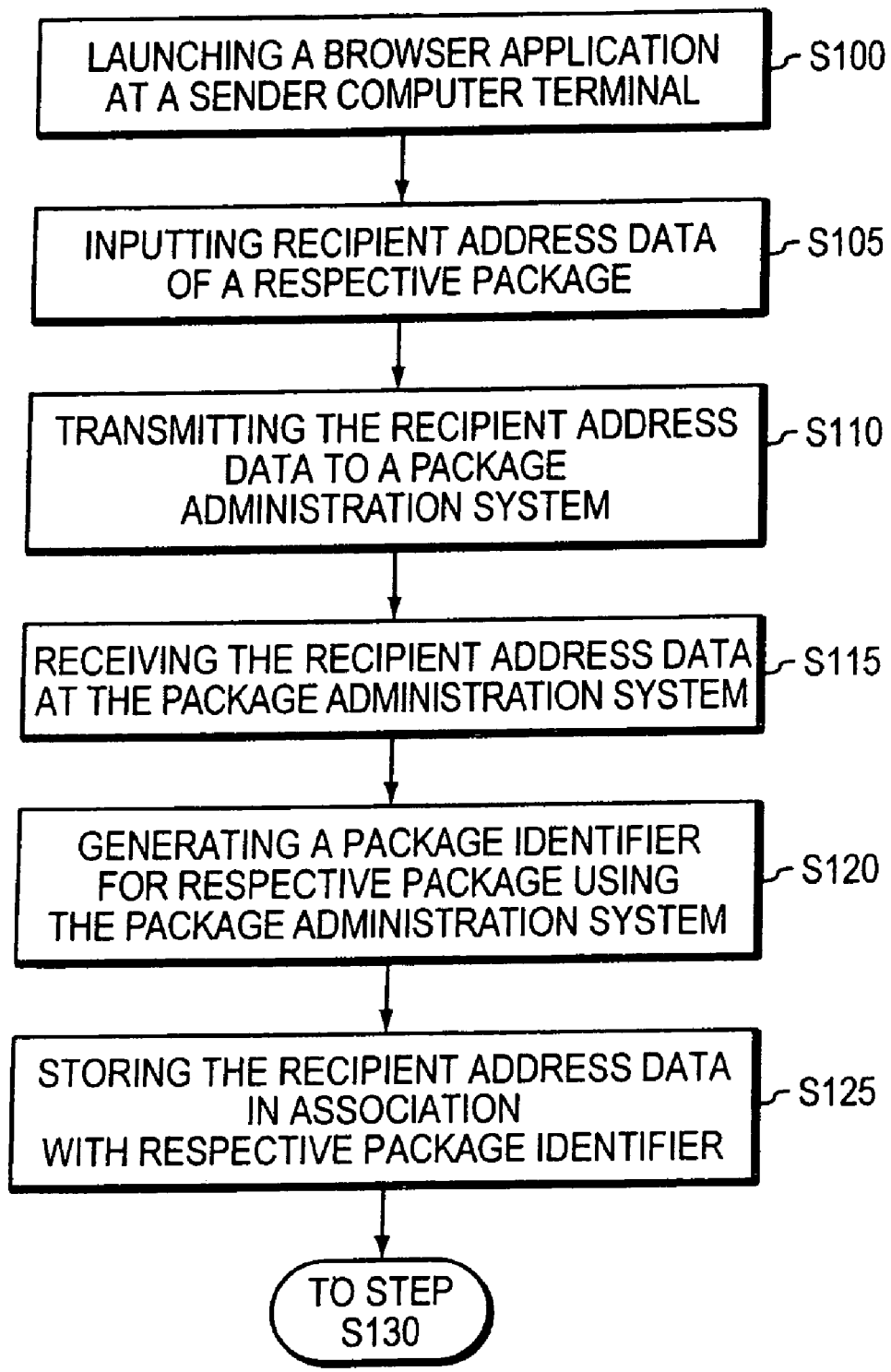
FIGS. 4-10 are flowcharts of a general method for tracking an intra-organizational package in accordance with a preferred embodiment of the invention.

FIG. 4 shows a typical sequence of steps for tracking an intra-organizational package 204 in accordance with the system schematically depicted in FIG. 1. At step S100, a browser application 208 is launched at a sender computer terminal 206. At step S105, a sender 202 inputs recipient address data 212 for a package 204 that needs to be mailed to a recipient 302. At step S10, the recipient address data 212 is transmitted to a package administration system 14. At step S115, the recipient address data 212 is received at the package administration system 14. At step S120, the package administration system 14 generates a package identifier 218 for respective package 204. At step S125, the package administration system 14 stores the recipient address data 212 in association with the respective package identifier 218.

Figure 5:
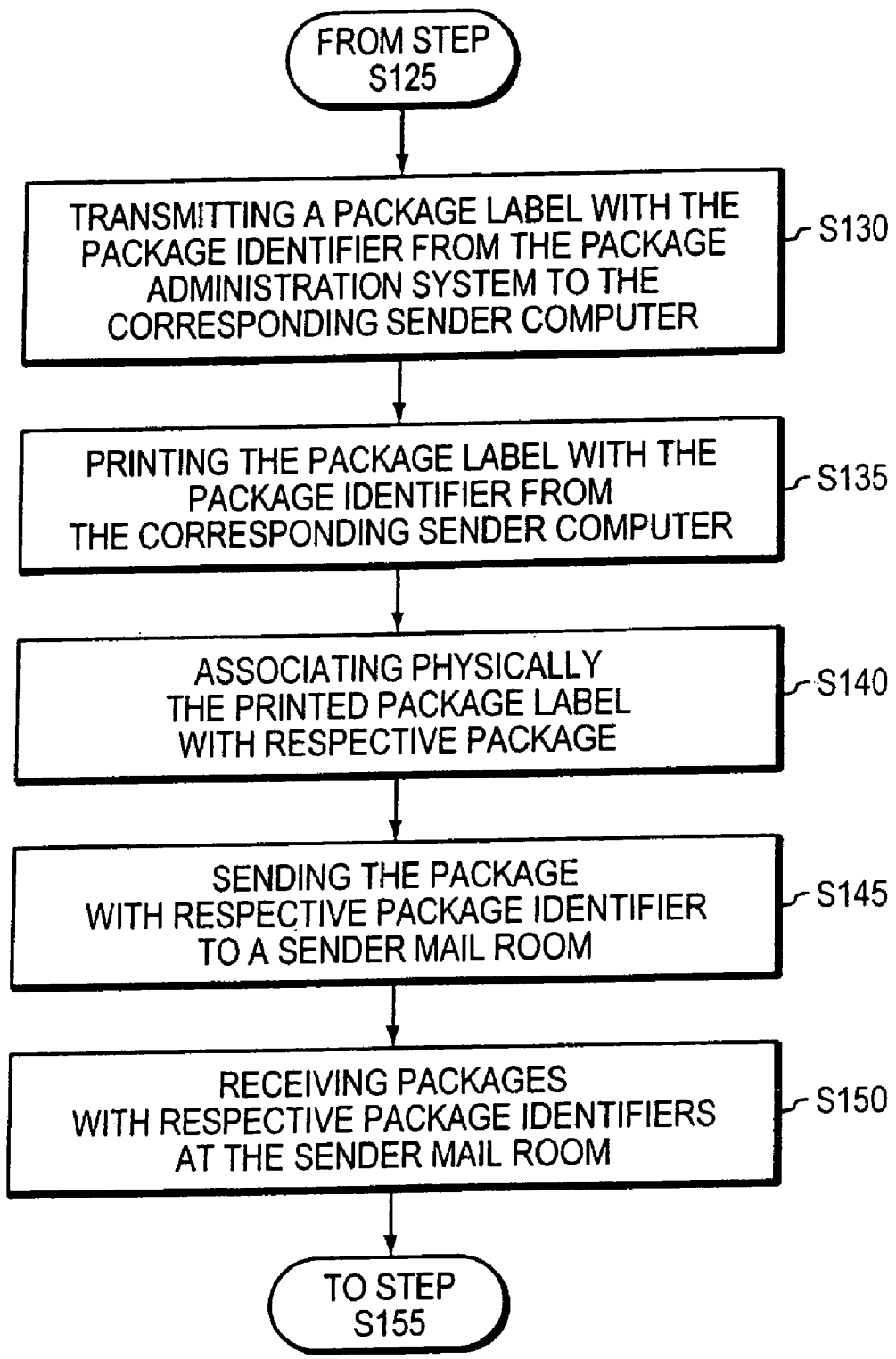

Turning now to FIG. 5, the process continues at step S130, wherein the package administration system 14 transmits a package label 219 with the package identifier 218 to the corresponding sender computer 206. At step S135, the package label 219 with the package identifier 218 is printed on print media from a printer 216 connected to the sender computer 206. At step S140, a sender 202 physically associates the printed package label 219 bearing the package identifier 218 with respective package 204. At step S145, the package 204 is sent with respective package identifier 218 to a sender mailroom 220. At step S150, packages 204 with respective package identifiers 218 are received at the sender mailroom 220.

Figure 6:
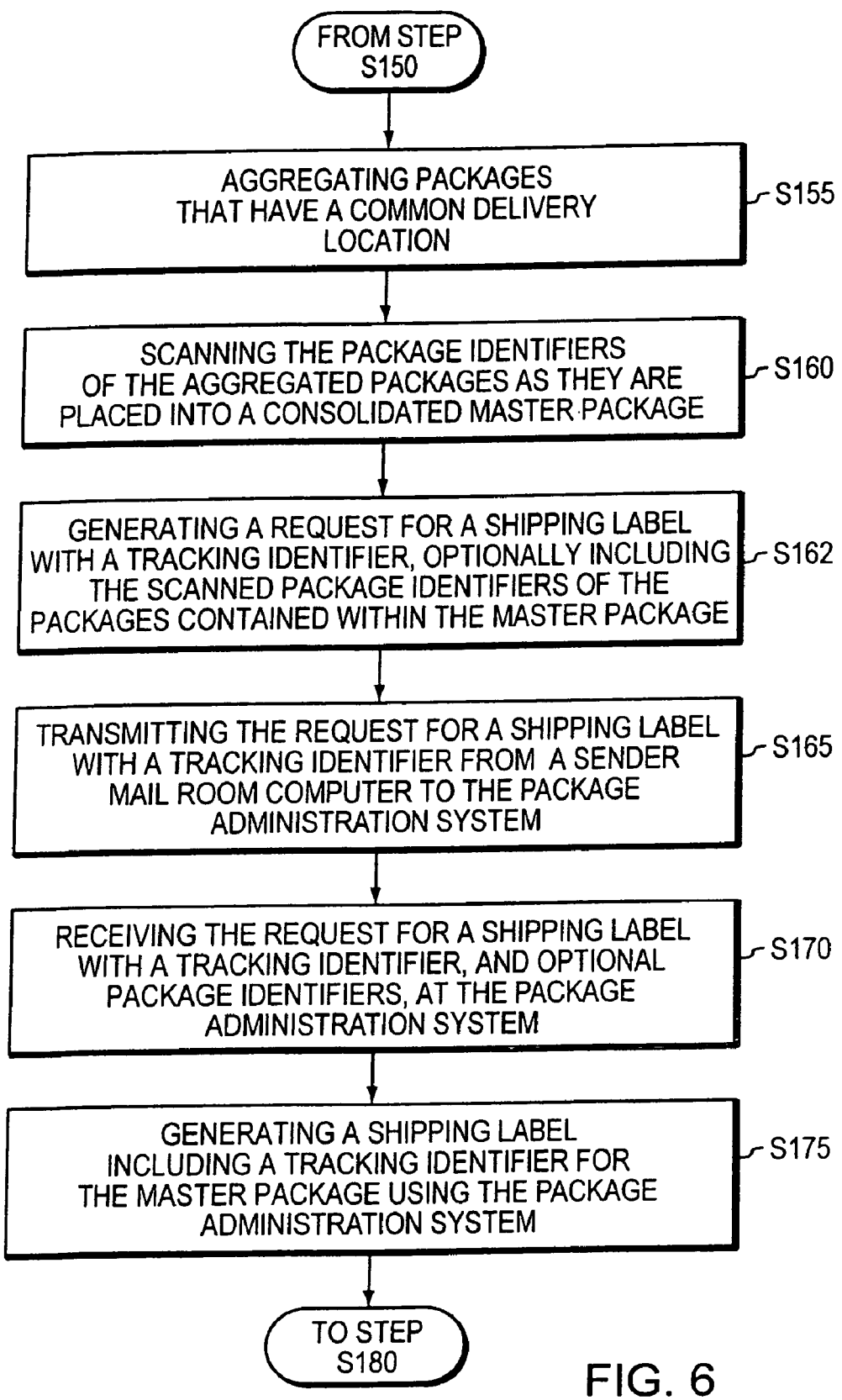

Turning now to FIG. 6, the process continues at step S155, wherein a mailroom attendant 226 aggregates the packages 204 that have a common delivery location 300. The sorting of the packages 204 bound for a common destination can be carried out by hand or can be computer assisted. At step S160, a mailroom attendant 226 scans the package identifiers 218 of the aggregated packages 204 as they are placed into a consolidated master package 234 destined for the common delivery location 300. At step S162, the attendant 226 generates a request for a shipping label 230 with a tracking identifier 231. The request can optionally include the package identifiers 218 for the packages 204 included in the master package 234. At step S165, the request for a shipping label 230 with a tracking identifier 231 is transmitted from the sender mailroom computer 250 to the package administration system 14. At step S170, the request for a shipping label 230, optionally including the package identifiers 218, is received at the package administration system 14. At step S175, the package administration system 14 generates a shipping label 230 including a tracking identifier 231 for the master package 234.

Figure 7:
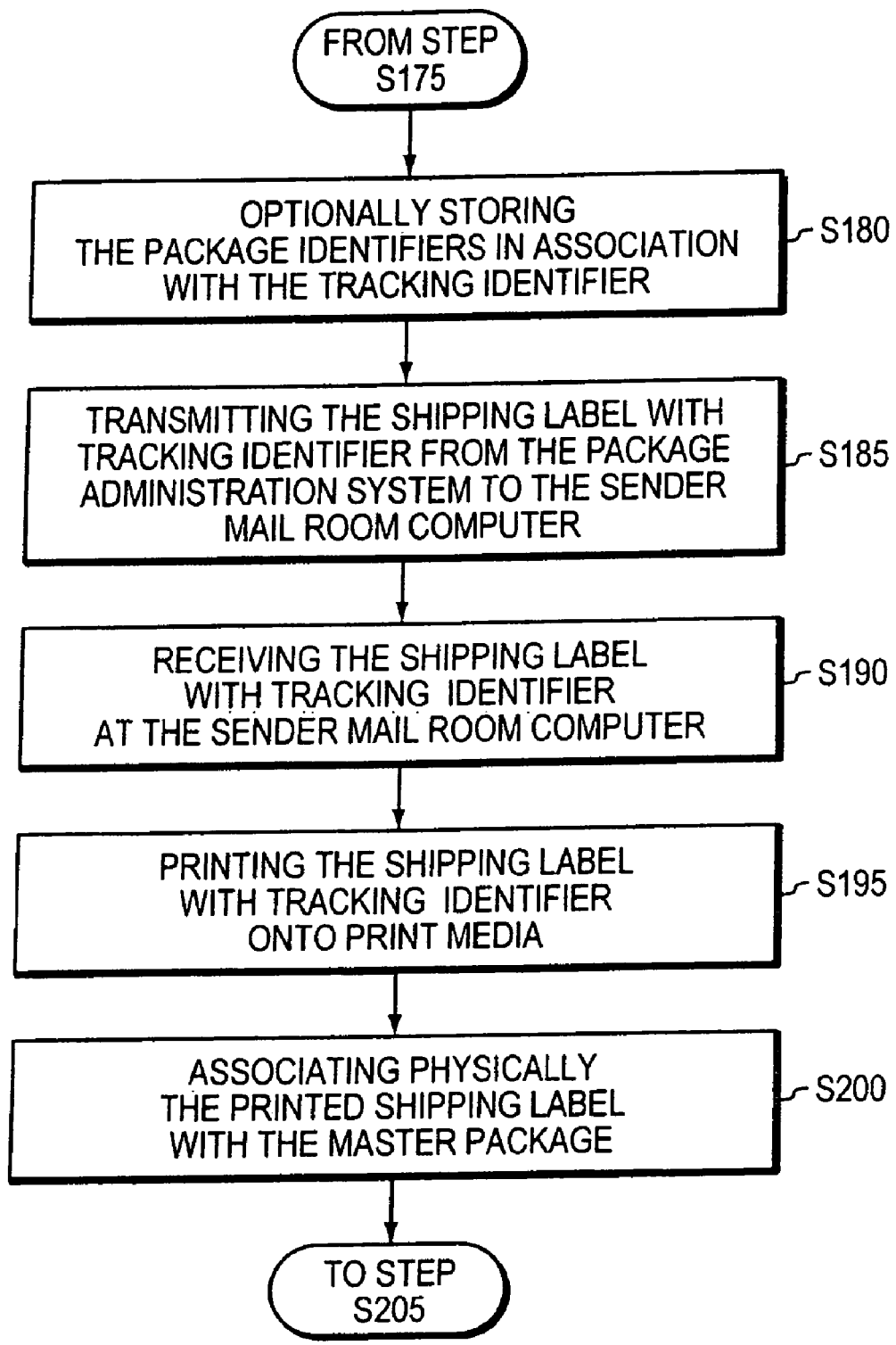

Turning now to FIG. 7, the process continues at step S180, wherein the package administration system 14 optionally stores the package identifiers 218 in association with the tracking identifier 231. At step S185, the package administration system 14 transmits the shipping label 230 with tracking identifier 231 from the package administration system to the sender mailroom computer 250. At step S190, the computer 250 receives the shipping label 230 with tracking identifier 231 from the package administration system 14. At step S195, the shipping label 230 with tracking identifier 231 is printed from the printer 232 connected to the computer 250. At step S200, a mailroom attendant 226 physically associates the printed shipping label 230 with the master package 234.

Figure 8:
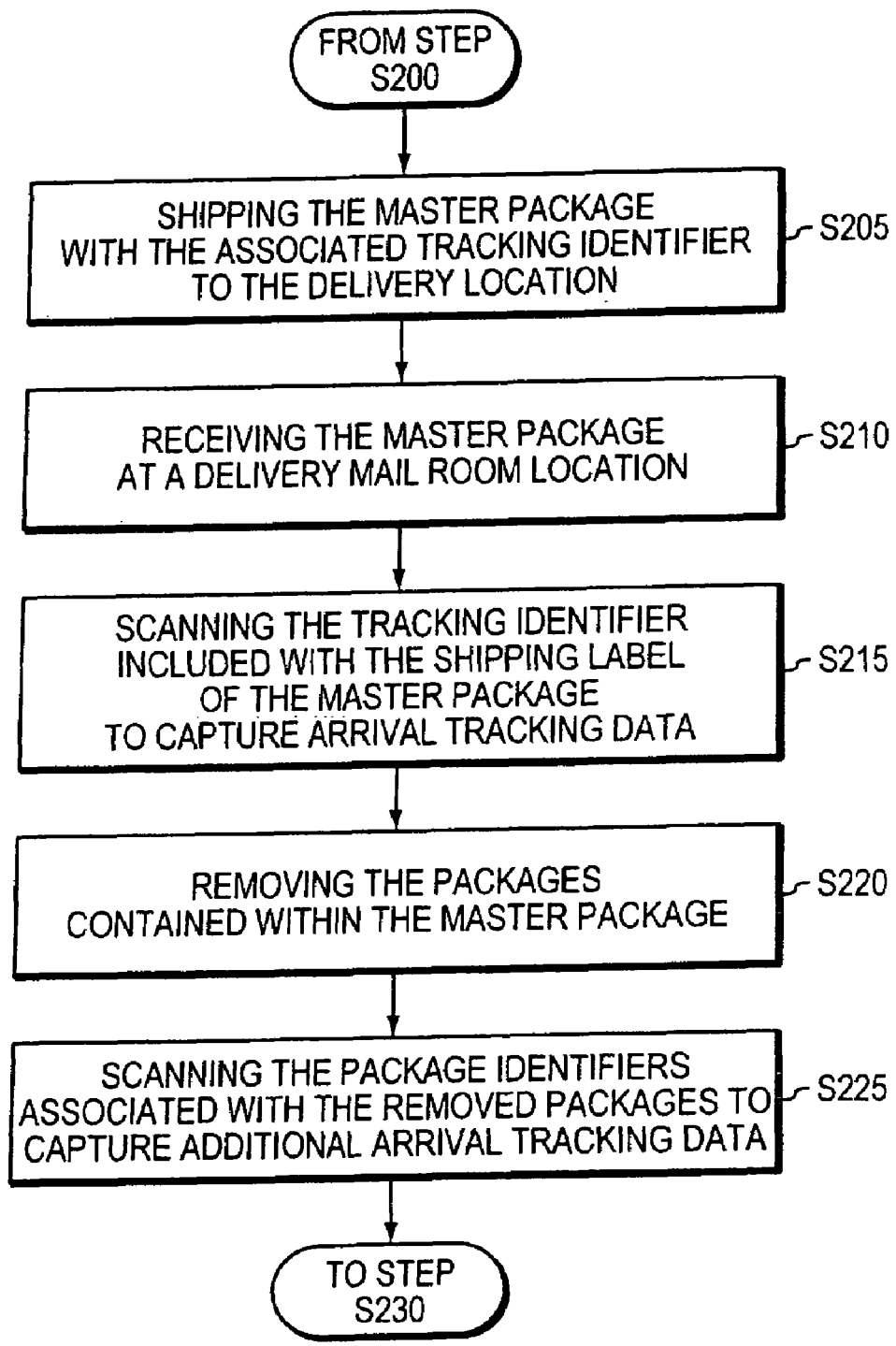

Turning now to FIG. 8, the process continues at step S205, wherein the mailroom attendant 226 ships the master package 234 with the associated tracking identifier 231 to the common delivery location 300. The master package 234 can be shipped via a carrier 260, which generates tracking data 266 indicating the status of the master package during transport, and transmits such tracking data to the package administration system 14. At step S210, the master package 234 is received at the delivery mailroom 320. At step S215, a mailroom attendant 326 scans the tracking identifier 231 of the master package 234 to capture arrival tracking data 328. At step S220, a mailroom attendant 326 removes the packages 204 from the master package 234. At step S225, the mailroom attendant 326 scans the package identifiers 218 associated with the removed packages 204 to capture additional arrival tracking data 328.

Figure 9:
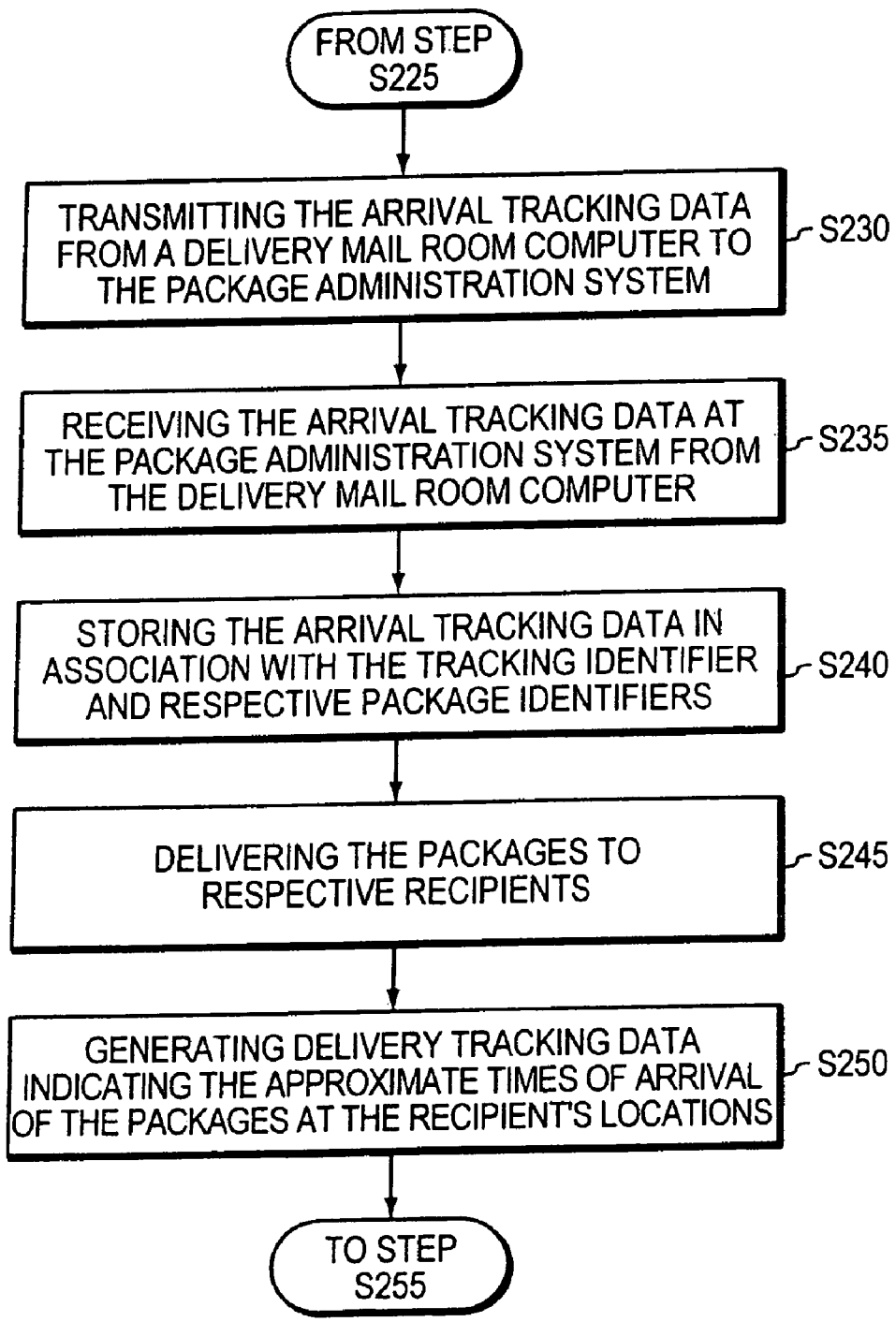

Turning now to FIG. 9, the process continues at step S230, wherein the arrival tracking data 328 is transmitted from the delivery mailroom computer 330 to the package administration system 14. At step S235, the arrival tracking data 328 is received at the package administration system 14. At step S240, the package administration system 14 stores the arrival tracking data 328 in association with the tracking identifier 231 and respective package identifiers 218. At step S245, delivery personnel 340 deliver the packages 204 to respective recipients 302. At step S250, the delivery personnel 340 generate delivery tracking data 348, which can include approximate dates, times, places, and/or personnel involved in delivery of packages 204 at respective recipient locations.

Figure 10:
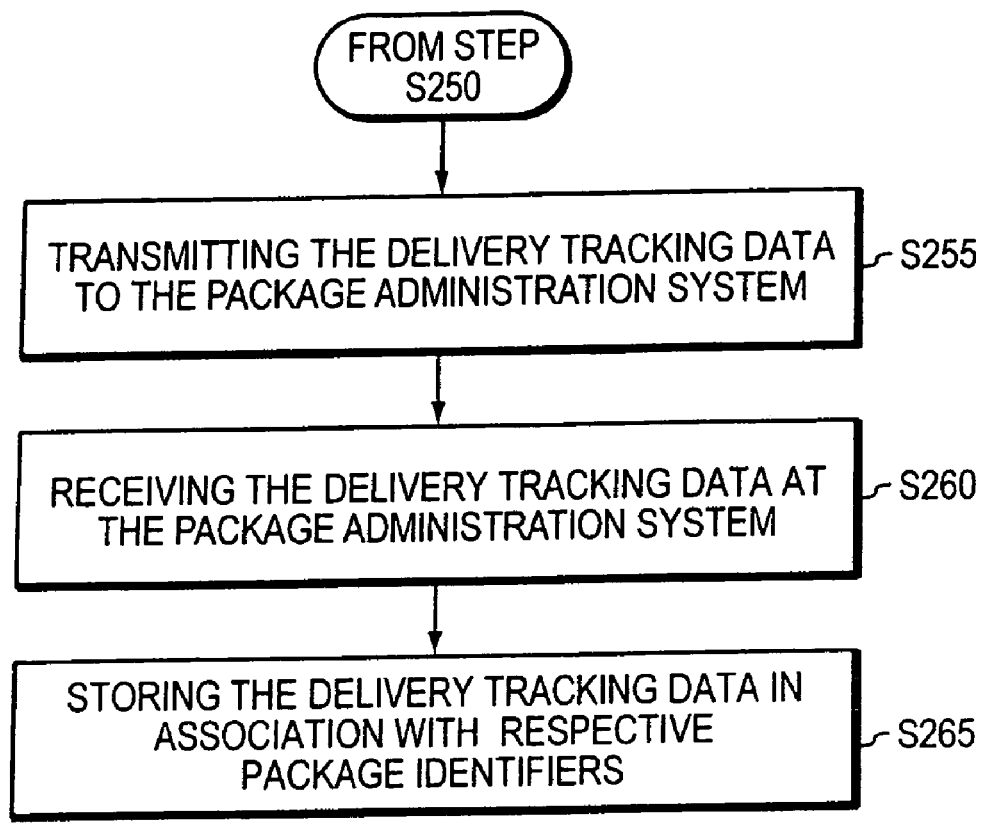

Turning now to FIG. 10, the process continues at step S255, wherein the delivery tracking data 348 is transmitted from a delivery location computer 344 to the package administration system 14. At step S260, the delivery tracking data 348 is received at the package administration system 14. At step S275, the package administration system 14 stores the delivery tracking data 348 in association with the respective package identifiers 218.

Figure 11:
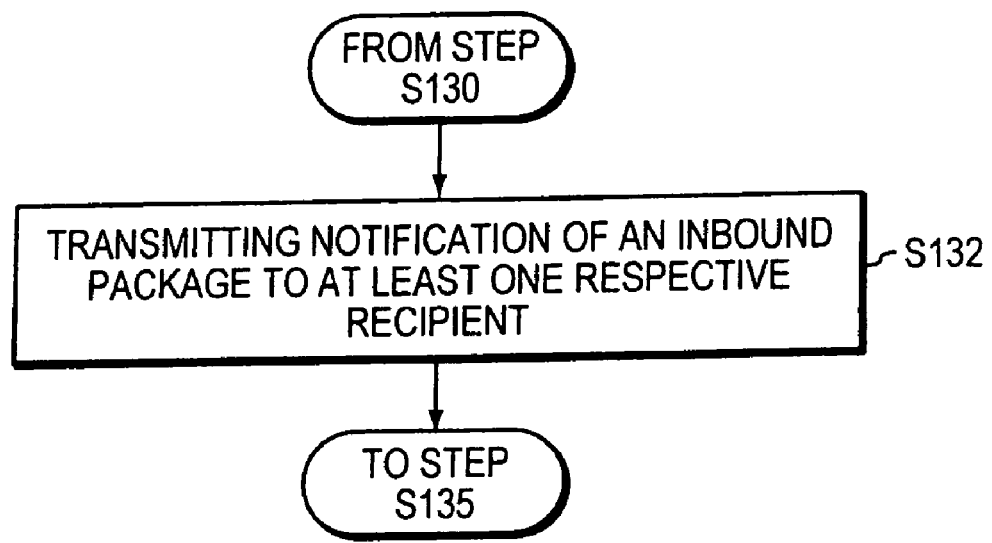
FIGS. 11-14 are flowcharts of general methods for using communications such as emails to notify interested persons of tracking events in accordance with a preferred embodiment of the invention.

FIGS. 11-14 illustrate how notification steps can optionally be included in the process described above. FIG. 11 shows a process, wherein at step S132, a communication such as an email notification is sent to at least one recipient 302 informing them of an inbound package 204. This step can be performed by the package administration system 14 after it generates a package identifier 218 for the package 204 that is to be shipped by the corresponding sender 202. However, this does not exclude the possibility that this step can be performed at another time at which its performance may be logical.

Figure 12:
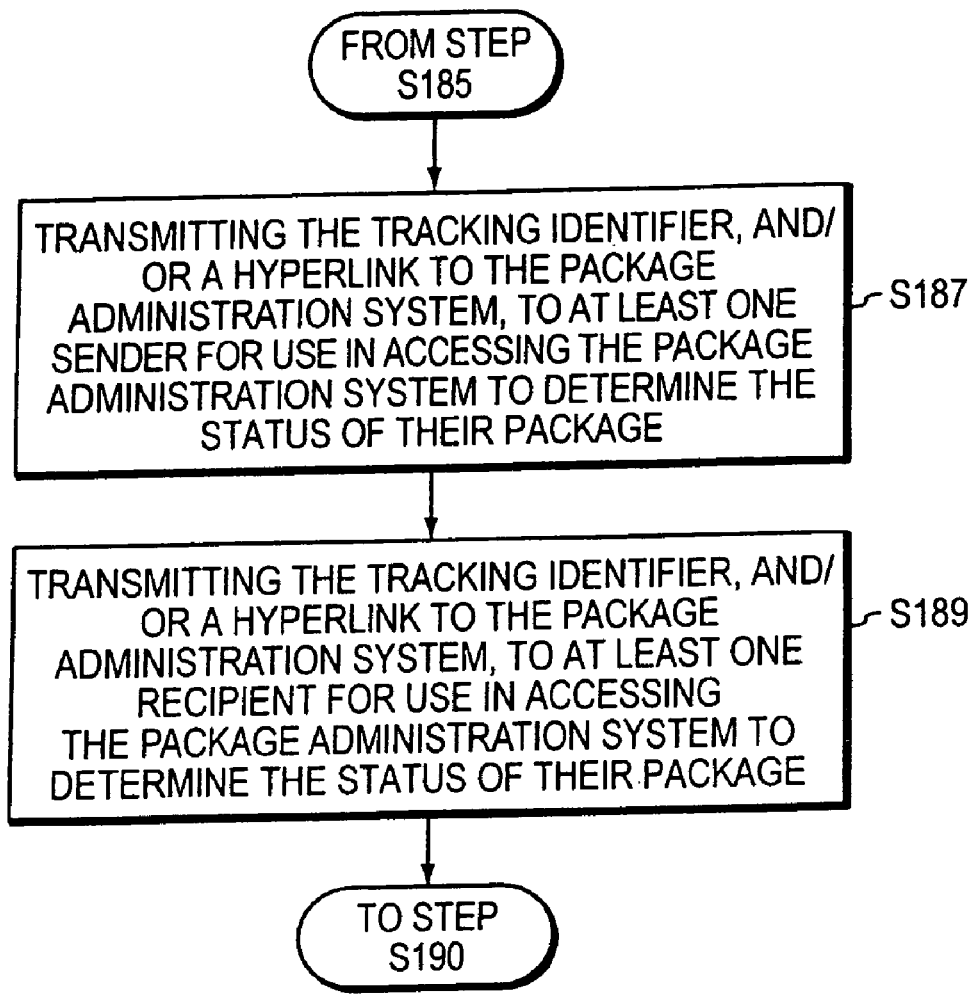

FIG. 12 shows a process wherein at step S187 a communication such as an email containing a tracking identifier 231, associated with a master package 234, is transmitted to at least one sender 202 for use in accessing the package administration system 14 to determine the status of a package 204 contained within the master package. Similarly, at step S189, a communication such as an email containing a tracking identifier 231, associated with a master package 234, is transmitted to at least one recipient 302 for use in accessing the package administration system 14 to determine the status of an inbound package 204 contained within the master package. Optionally, any such communications can include a hyperlink to the package administration system website for convenience in accessing the tracking data associated with a package.

By providing the sender 202 and/or recipient 302 with the tracking identifier 231 of the master package 234, which contains their respective package 204, the sender and/or recipient can view the status of their package as it is shipped within the corresponding master package via an external carrier 260. In other words, the sender and/or recipient can view the status of their respective package by accessing the package administration system's website, and entering the tracking identifier 231. In response to receiving the tracking identifier 231, the package administration system 14 retrieves the tracking data associated with the corresponding master package, and transmits the tracking data to the requesting sender's and/or recipient's computer via the network 12.

Figure 13:
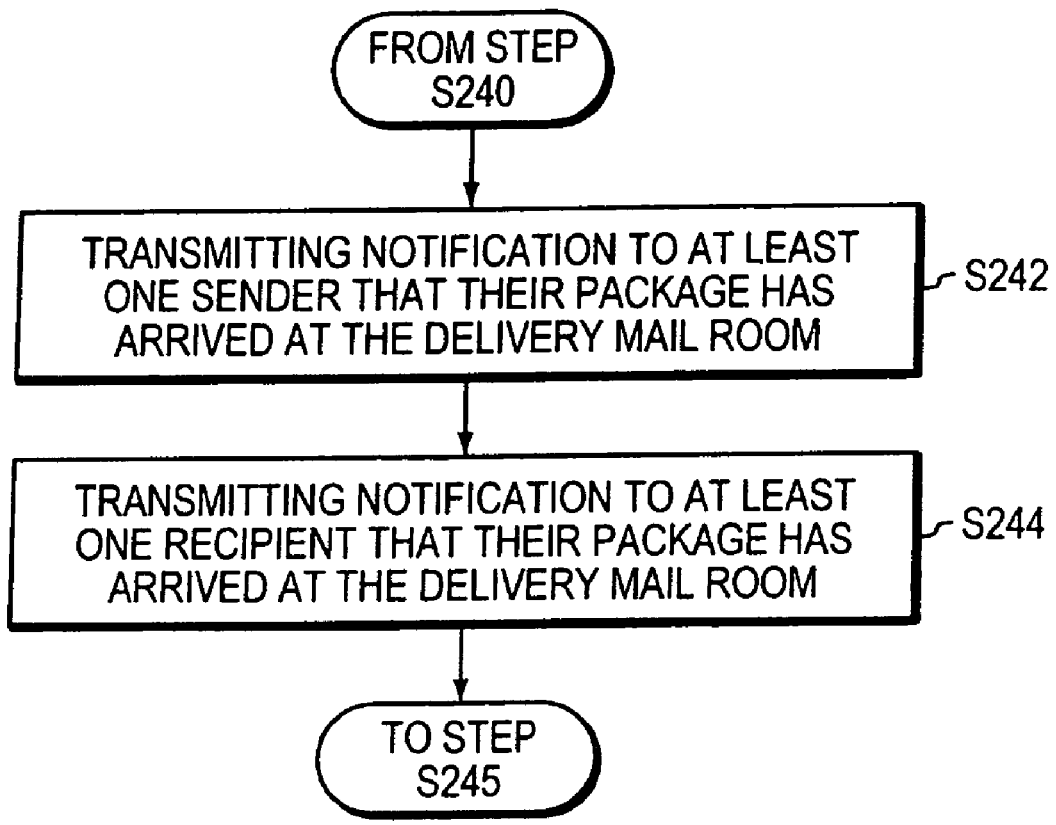
Figure 14:
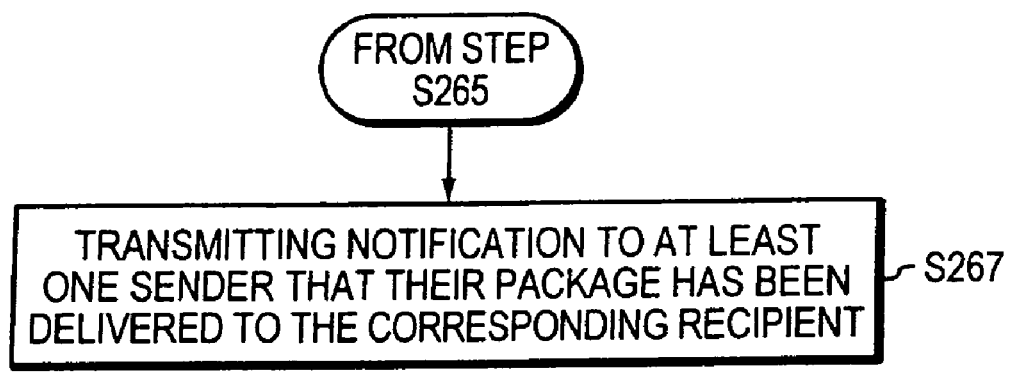

Communications such as email notifications can also be used to inform senders 202, recipients 302, and/or other interested persons of events that occur from the time a master package 324 arrives at a delivery location 300. FIG. 13 shows a process comprising step S242 wherein a notification, such as email, is transmitted to at least one sender 202 informing them that their package 204 has arrived at the delivery mailroom 320. Similarly, at step S244, a notification, such as email, is transmitted to at least one recipient 302 informing them that their package 204 has arrived at the delivery mailroom 320. FIG. 14 shows yet another possible notification step, wherein at step S267, a communication such as an email is transmitted to at least one sender 202 informing them that their package 204 has been delivered to the corresponding recipient 302.

Figure 15:
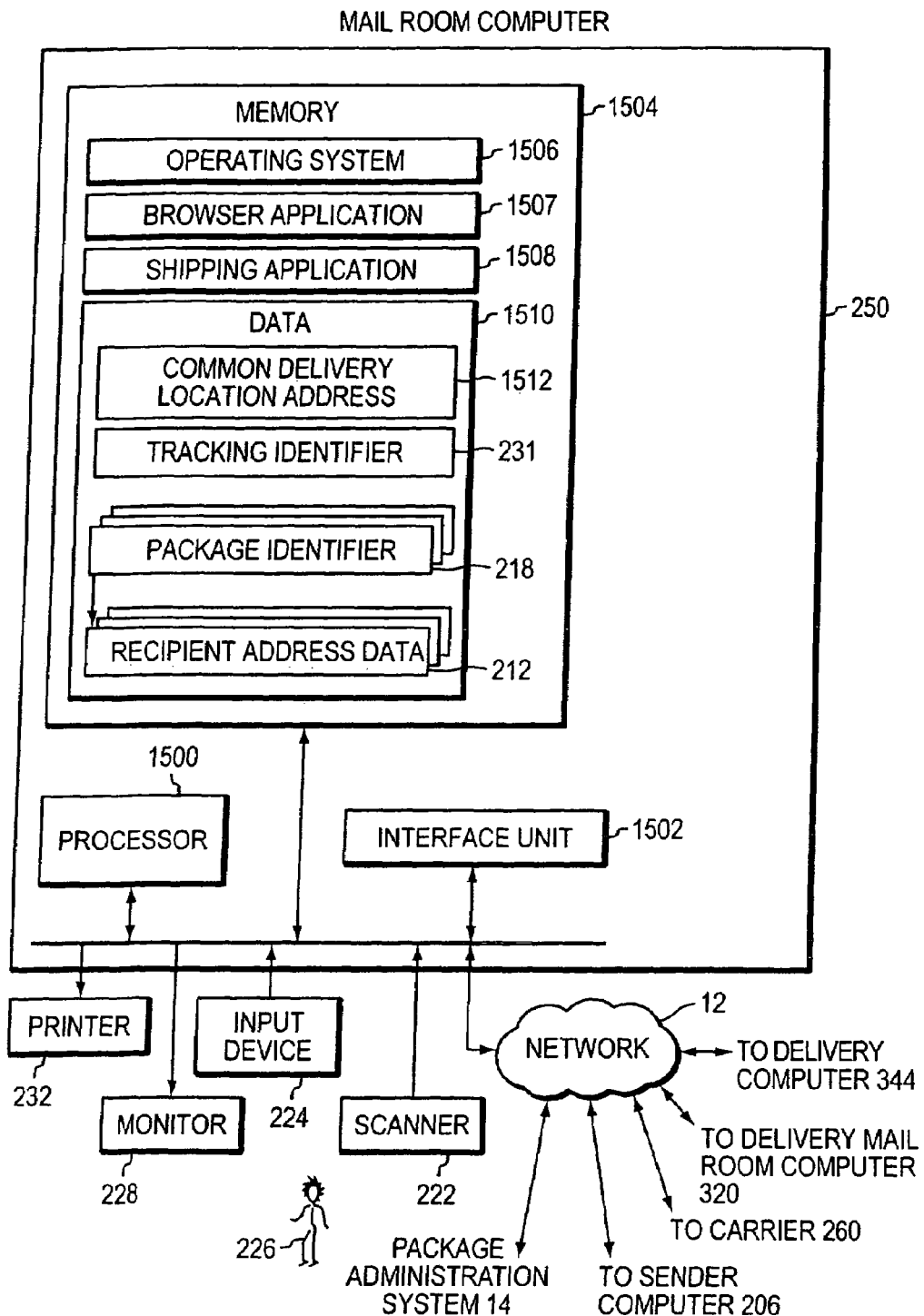
FIG. 15 is a block diagram of a mailroom computer used to sort packages bound for a common destination in accordance with a preferred embodiment of the invention.

FIG. 15 depicts an embodiment of the invention wherein a sender mailroom computer 250 is used to sort packages 204 bound for a common destination 300. The sorting of packages 204 can assist a mailroom attendant 226 in aggregating packages bound for a common delivery location 300 so that such packages can be shipped in a consolidated master package 234. Sender mailroom computer 250 includes a processor 1500, an interface unit 1502, and memory 1504. The interface unit 1502 is used by the computer 250 to send and receive data over a network 12. The memory 1504 includes: an operating system 1506 executed by the processor 1500 for controlling the allocation and usage of hardware resources; a browser application 1507 for accessing a package administration system 14 to be used in sorting packages 204; optionally, a client-side shipping application 1508 that can be used for sorting packages 204; and a data storage area 1510. Data storage area 1510 can include common delivery location addresses 1512, tracking identifiers 231, package identifiers 218, and recipient address data 212.

A mailroom attendant 226 enters package identifiers 218 into the computer 250. The package identifiers can be entered using a scanner 222 or an input device 224 coupled to communicate with the computer 250, for example. The scanner can be optical or electromagnetic, and the input device can be a keyboard, keypad, or other device. The mailroom attendant can operate the computer 250 using input device 224, the monitor 228, and the browser application 1507, causing it to transmit the package identifiers 218 from the computer 250 to the package administration system 14 over a network 12. In one embodiment, the package administration system 14 can be configured to retrieve recipient address data 212 from a database 16 corresponding to the received package identifiers 218, and sort the respective packages 204 according to common destinations using the retrieved recipient address data. The results of the sort process can be transmitted from the package administration system 14 to the computer 250, and displayed to the attendant 226 on the monitor 228 using the browser 1507. In another embodiment of the present invention, the computer 250 could be configured with a client-side shipping application 1508 operable to: retrieve recipient address data 212 from the package administration system 14 corresponding to the package identifiers 218 for packages to be shipped; compare the recipient address data for respective package identifiers to determine packages having a common delivery location; and, sort the recipient address data for packages having a common delivery location. The results of the sort process can be displayed to the attendant 226 on the monitor 228 using the browser 1507.

The mailroom attendant 226 or other user can use the sort results to select packages 204 bound for a common delivery mailroom 320 for inclusion in a master package 234. The mailroom attendant 226 can operate the computer 250 to generate a request for a shipping label 230 with a tracking identifier 231, optionally including in the request the package identifiers 218 of the packages 204 to be included in the master package 234. The computer 250 transmits this request to the package administration system 14, which generates and optionally stores the tracking identifier 231 in association with the package identifiers 218. The package administration system 14 transmits the shipping label 230 with tracking identifier 231 to the computer 250 via the network 12. The attendant 226 can print the shipping label 230 with tracking identifier 231 onto media using the printer 232, apply the shipping label to the master package 234, and ship the package with the shipping label to the delivery mailroom 320.

Figure 16:
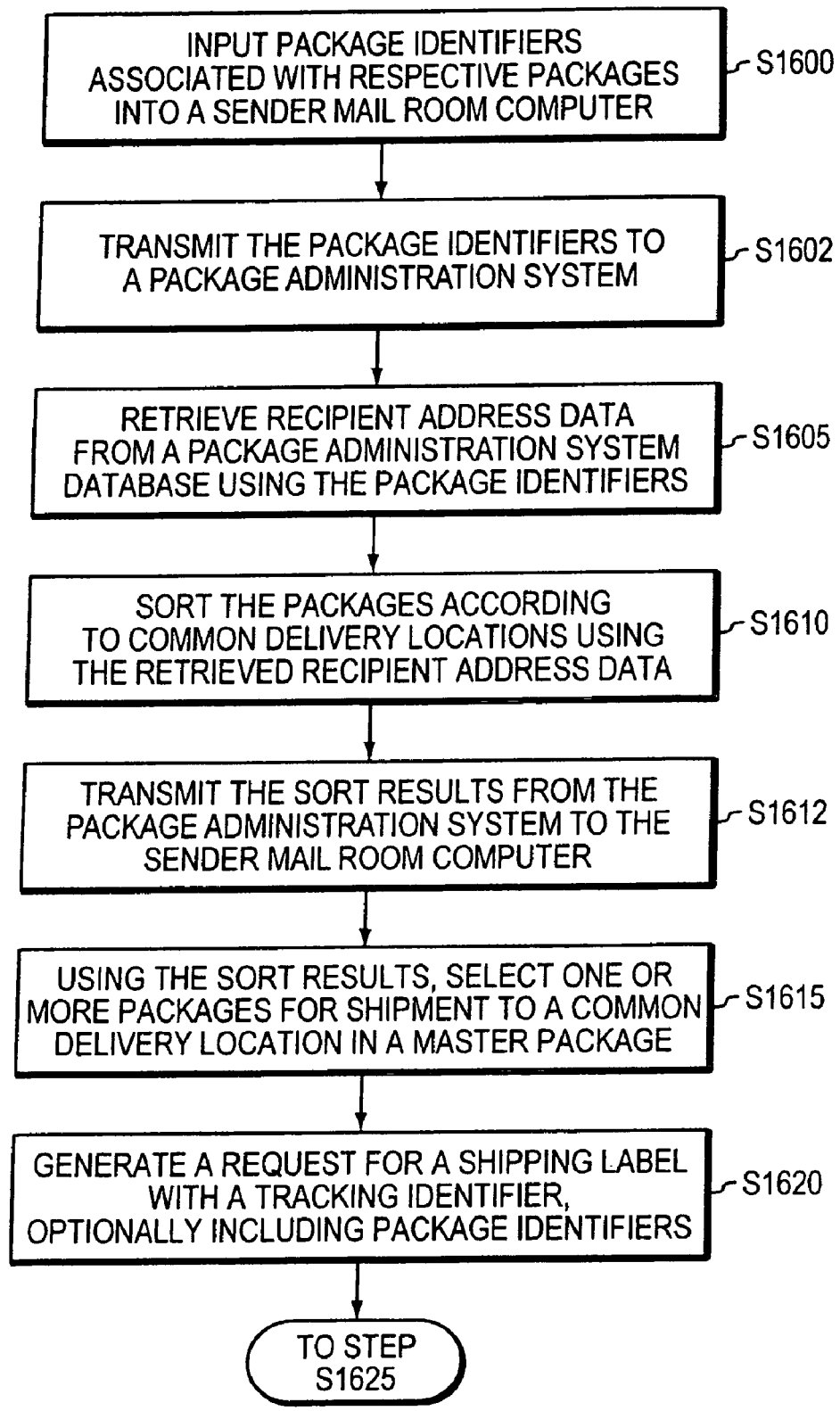
FIGS. 16-17 are flowcharts of a general method for sorting packages in a sender mailroom based on common delivery locations in accordance with a preferred embodiment of the invention.

FIG. 16 shows a process for sorting packages 204 based on a common delivery location according to one embodiment of the present invention. This process can be carried out by an attendant 226 using a computer 250, or can be fully automated without requiring human intervention. At step S1600, package identifiers 218 associated with respective packages 204 are input to a computer 250. At step S1602, the package identifiers 204 are transmitted from the computer 250 to a package administration system 14. At step S1605, recipient address data 212 associated with each of the package identifiers 218 is retrieved from a package administration system database 16. At step S1610, the packages 204 are sorted according to common delivery locations using the retrieved recipient address data 212. At step S1612, the results of the sort process are transmitted from the package administration system 14 to the computer 250. At step S1615, the sort results are used to select one or more packages for shipment to a common delivery location 300 in a master package 324. In step S1620 the attendant 226 and/or computer 250 generates a request for a shipping label 230 with a tracking identifier 231. The request can include the package identifiers 218 for the packages to be included in the master package 324.

Figure 17:
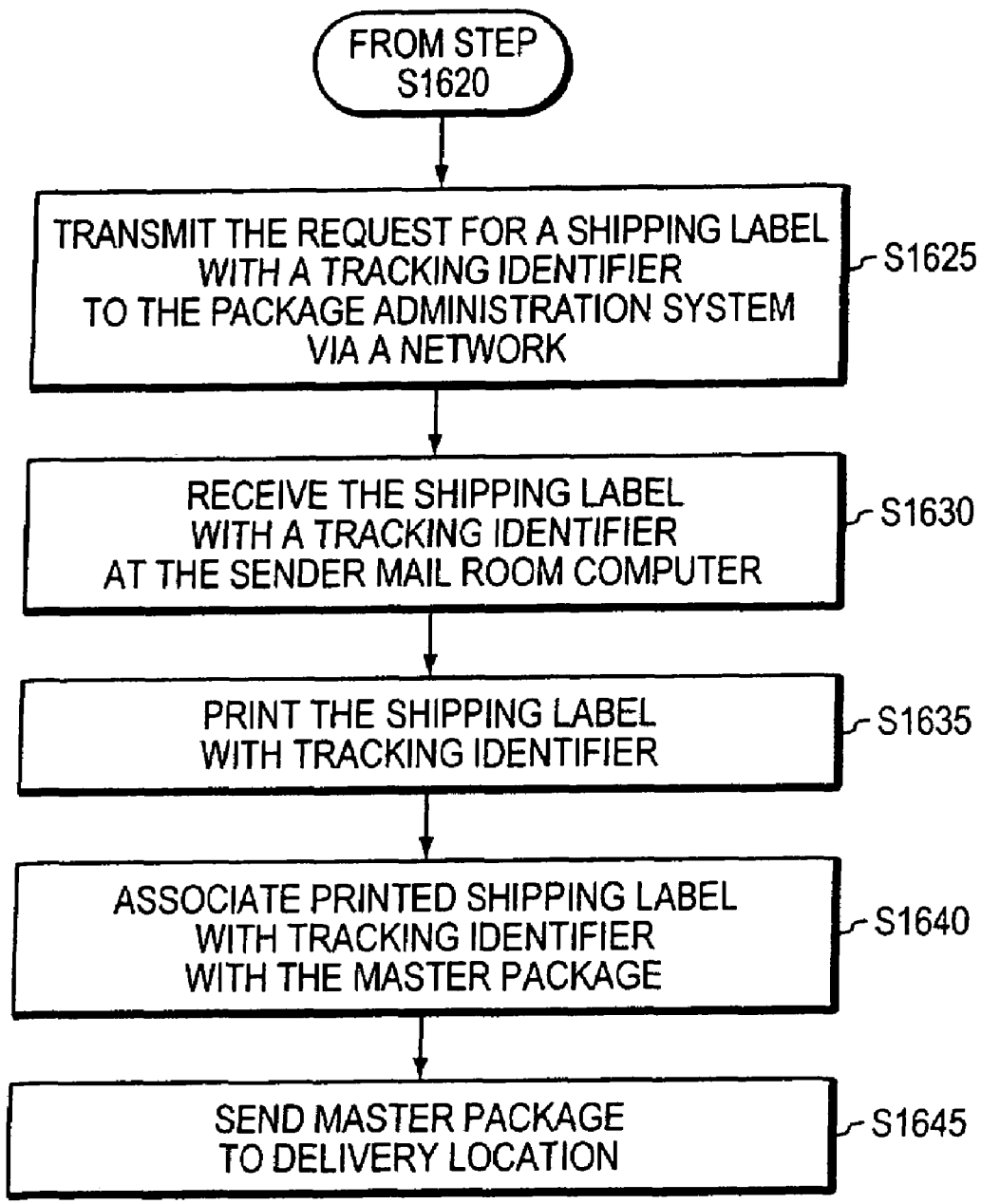

Turning now to FIG. 17, the process continues at step S1625, wherein the request for the shipping label 230 with tracking identifier 231 is transmitted to the package administration system 14 via the network 12. The package administration system 14 receives the request and optional package identifiers 218, generates a shipping label 230 including a tracking identifier 231, optionally stores the package identifiers 218 in association with the tracking identifier 231, and transmits the shipping label with tracking identifier 231 to the computer 250. The computer 250 receives the shipping label 230 with tracking identifier 231 in step S1630, and prints the shipping label with tracking identifier 231 onto print media 233 in step S1635. In Step S1640, the attendant 226 associates the printed shipping label 230 with the master package 234. The attendant 226 sends the master package 234 to the delivery location 320 in step S1645.

Overview of Radio Frequency Identification (RFID) Technology

Radio frequency identification technology uses radio waves rather than optics to capture and transmit data. RFID is basically a form of labeling where electronic labels or tags are programmed with unique information and attached to objects to be identified or tracked. In RFID, electronic chips are used to store data that can be broadcast via radio waves to a reader, thereby eliminating the need for a direct line of sight and making it possible for tags to be placed virtually anywhere. Additional benefits of RFID are the greater data storage capacity of the RFID tag in comparison to the barcode and the decreased likelihood that the RFID tag will be destroyed or otherwise made unreadable.

A typical RFID system comprises a reader, a tag and a data processing system to process the data read from the tag. The tag also is called a transponder, an expression that is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to read data and otherwise communicate with a tag, a microprocessor to check and decode the data from the tag, a memory to store data, including that received from the tag, and one or more antennas to receive the signal.

Unlike a barcode reader, which is limited to reading a single barcode at a time, a RFID reader may have more than one tag in its interrogation zone. The interrogation zone, as that term is used herein, refers to the area covered by the electromagnetic field generated by the reader's antenna. The process of reading a number of transponders within a system's interrogation zone is known as batch reading. Software applications known as anti-collision algorithms exist that permit a reader to avoid data collision from several tags that enter the interrogation zone at the same time. One of three different anti-collision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area.

Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anti-collision techniques are divided into two categories: interrogator and transponder driven procedures. In addition, interrogator driven time domain anti-collision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anti-collision procedures, the transponder, rather than the interrogator, controls the data flow. In general, transponder driven procedures are based on the cyclic transmission of identifiers by transponders and are designed such that it is unlikely that any two transponders will send the same identifier at the same time.

RFID package tags may be active or passive depending on whether they have an on-board power source or not. In general, active tags use batteries to power the tag transmitter (radio) and receiver. This independent power source provides greater capabilities such as, for example, greater communication ranges, better noise immunity and higher data transmission rates than passive tags. But, these tags usually contain a greater number of components than do passive tags and therefore, are usually larger in size and are more expensive than passive tags. In addition, the life of an active tag is directly related to battery life.

In contrast, a passive tag reflects the RF signal transmitted to it from a reader and adds information by modulating the reflected signal. A passive tag does not use a battery to boost the energy of the reflected signal. But, a passive tag may use a battery to maintain memory in the tag or power the electronics that enable the tag to modulate the reflected signal. Passive tags have virtually unlimited life, but have shorter read ranges and require high-powered readers.

Mail Sorting Systems Based on RFID

Figure 21:
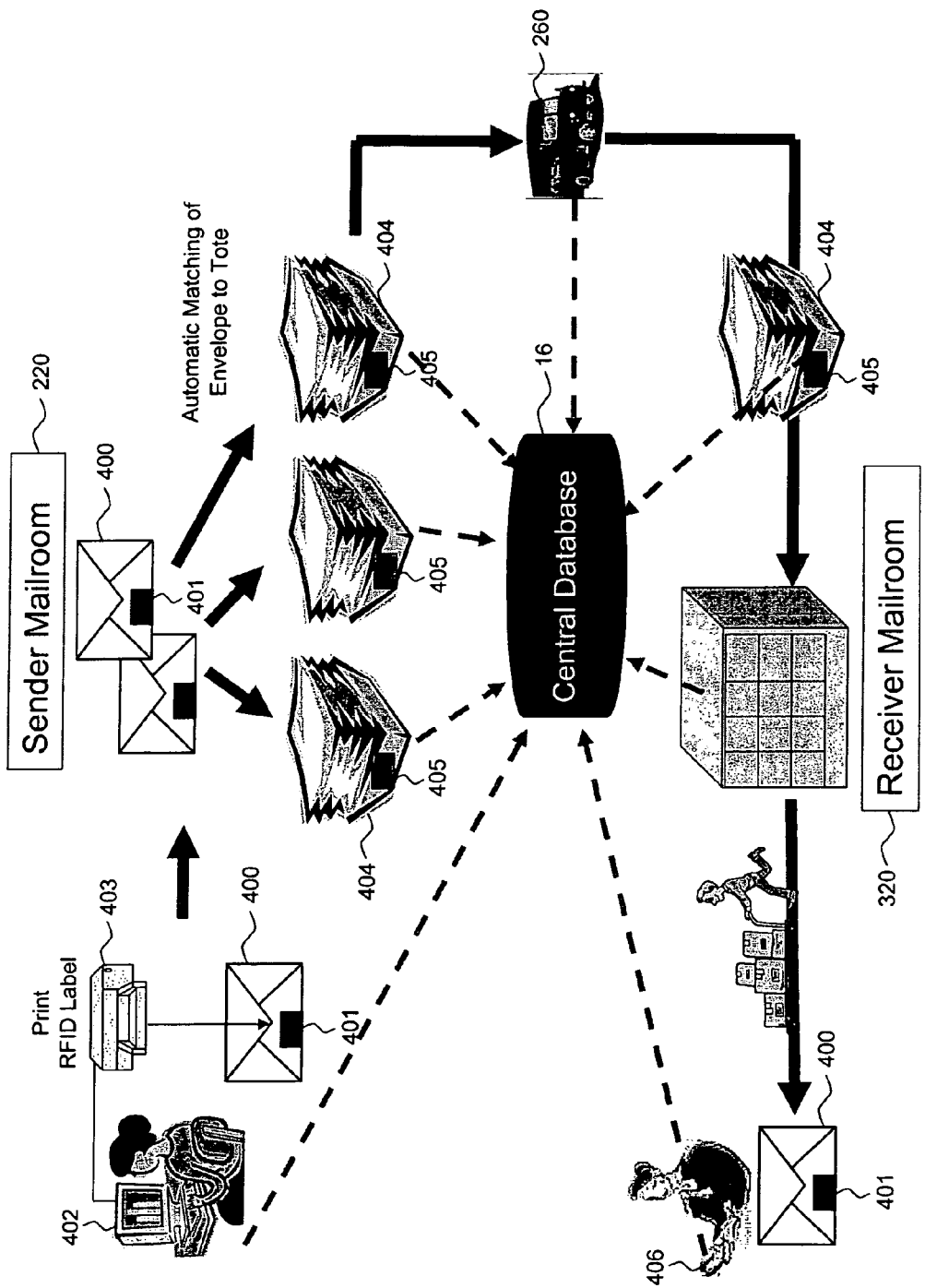
FIG. 21 shows one embodiment of an intra-organizational mail system that utilizes RFID technology to communicate sorting instructions.

FIG. 21 shows one embodiment of an intra-organizational mail system that utilizes RFID technology to communicate sorting instructions. To assist in the processing of mail items 400, an RFID tag 401 can be placed on (or in) each mail item that is to be sent from a sender to a receiver. In one embodiment, the RFID tag 401 is a passive RFID label tag, which can be generated using a sender computer 402 and connected RFID label printer 403. The RFID label tag 401 typically includes destination or address data, and a unique identifier for uniquely identifying the mail item 400. Such information may be encoded on the RFID label 401 in one or more formats (bar code, human readable, stored in memory). This and other related information can be stored in the central database 16, when the label 401 is generated.

As would be understood by one of ordinary skill in the art, RFID label tags (also known as "smart labels") are a form of RFID tag that consists of an adhesive label that is embedded with an ultra-thin RFID tag "inlay" (the tag Integrated Circuit (IC) plus printed antenna). The tag inlay can be encoded with fixed or variable data, while the label can contain all the bar codes, text, and graphics used in established applications. A read/write RFID label also can be programmed and reprogrammed in use, following the initial coding that takes place during the label production process.

In the sender mailroom 220, personnel or sorting operators typically sort most outbound mail items 400 into individual totes 404. A tote (i.e., consolidated master package) can be any type of bag, box or other container that is used to hold a plurality of mail items 400 destined for a common delivery location 300. In one embodiment of the present invention, a tag reader device 405, which is capable of reading information stored on the RFID tags 401, is attached to each tote 404 to help prevent mis-sorts. When a mail item 400 is brought within range of the tag reader device 405, the tag reader device automatically reads information from the RFID tag 401 affixed to the mail item. The tag reader device 405 can compare the information obtained from the tag 401 to other information (e.g., tote destination data) stored in memory, to determine whether the mail item 400 is being placed in the correct tote. As will be described in greater detail below, each tag reader device 405 can be programmed with sorting information before or during each sort operation. In one embodiment, the programming of sorting information onto each tag reader device 405 can occur via wireless communication between the tag reader device and a host computer or RFID reader/writer, which is located in the sender mailroom 220. Such information may include, for example, data identifying the location (or locations) to which the tote 404 will be transported, which can be compared against the intended destination of each mail item 400, or it may include a list of unique identifiers for uniquely identifying a predetermined list of mail items that are to be placed in that particular tote.

In one embodiment, if the item 400 is not being placed in the correct tote 404, the tag reader device 405 can be configured to provide some type of audio or visual feedback to the sorting operator. For example, the tag reader device 405 may be equipped with an indicator device such as an LED that illuminates (e.g., turns red) in response to a potential mis-sort being detected. The tag reader device 405 can also be configured to maintain a record of all mail items 400 that are placed in the tote 404. This information can in turn be communicated to the central database 16 via a mailroom computer (not shown). As would be understood by one of ordinary skill in the art, the tag reader device 405 can also be configured to provide positive feedback, which indicates to a sorting operator that a mail item 400 is being placed in the correct tote or container 404.

The tag reader device 405 can be any type of active RFID tag, portable reader, or other such device that is capable of interrogating the RFID labels 401, which are associated with corresponding mail items 400. For example, there are many types of active RFID tags that are equipped with a battery and an integrated transmitter that are capable of communicating with other tags and devices without the presence of a reader. Alternatively, the tag reader device 405 may be a type of portable RFID reader, such as SkyeTek, Inc.'s "SkyeModule™ M1-mini," which is a small self-contained RFID reader, complete with on-board antenna, low 1-cell battery power, and contactless read/write support of 13.56 MHz (HF) ISO and EPC tags and smart labels. As would be readily understood by one of ordinary skill in the art, numerous other types of active tags, readers, or other such devices could be used as well.

As with other embodiments described above, each tote 404 can be shipped via an external carrier 260 to its corresponding destination location 300. As the carrier 260 transports the tote 404 from the sender location 200 to the delivery location 300, optical or electromagnetic scanners and computers internal to the carrier's logistics network can scan a tracking identifier 231 (or other indicia) on the tote 404, to generate tracking data indicating the status of the tote during transport. For example, the tracking identifier 231 associated with the tote 404 can be scanned by such equipment at one or more of a number of different points, such as by a driver 261 who picks up the tote at the sender mailroom 220 and uses a hand-held scanning device to read the tracking identifier from the tote, at hubs 262 that receive and sort the tote and have equipment to scan the tracking identifier, and finally by a delivery driver 264 who delivers the tote to the delivery mailroom 320 and uses a hand-held device to scan the tote prior to delivery. This information can be stored in the central database 16 to provide continued visibility of the tote 404 and the mail items 400 contained therein.

In one embodiment, sort assist systems that utilize RFID technology to communicate sorting instructions can be used at the sender mailroom 320 to sort the mail items 400 contained in each tote. After the mail items 400 have been sorted using such systems, which will be described in detail below, internal delivery personnel at the delivery location 300 deliver the mail items to their respective recipients. In some cases, a final delivery scan of the individual mail items 400 can be performed using a portable data capture device 406. As shown, this information also can be provided to the central database 16, thus ensuring end-to-end visibility in the process of sending a mail item 400 from a sender to a receiver within the organization.

Figure 22:
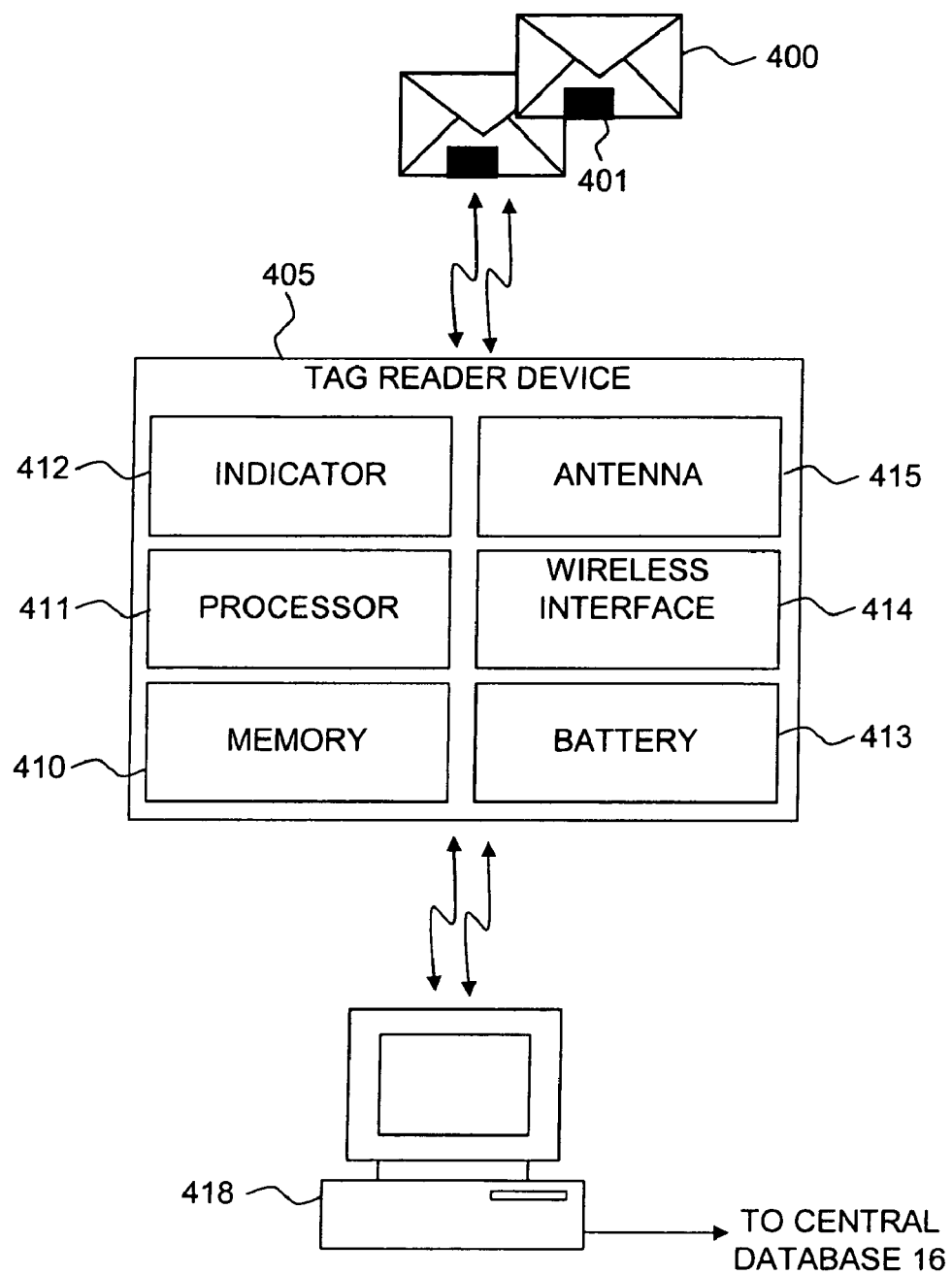
FIG. 22 shows a high-level block diagram of a tag reader device that can used for communicating sorting instructions to a sorting operator in accordance with one embodiment of the present invention.

FIG. 22 shows a high-level block diagram of a tag reader device 405 that can be affixed to a tote 404 for communicating sorting instructions to a sorting operator in accordance with one embodiment of the present invention. Generally described, this embodiment of the tag reader device 405 includes memory 410, a processor 411, an indicator device 412, a battery 413, a wireless interface 414, and an antenna 415.

As indicated above, the tag reader device 405 can be any type of active RFID tag, portable reader, or other such device that is capable of interrogating the RFID labels or tags 401 that are associated with corresponding mail items 400, which are to be sorted. For example, there are many types of active RFID tags that are equipped with a battery and an integrated transmitter that are capable of communicating with other tags and devices (e.g., a host computer 418) without the presence of a reader. Alternatively, the tag reader device 405 may be a type of portable RFID reader, such as SkyeTek, Inc.'s "SkyeModule™ M1-mini," which is a small self-contained RFID reader, complete with on-board antenna, low 1-cell battery power, and contactless read/write support of 13.56 MHz (HF) ISO and EPC tags and smart labels. As would be readily understood by one of ordinary skill in the art, numerous other types of active RFID tags, readers, and other such devices could be used as well.

When a mail item 400 having an RFID tag 401 is brought within range of the tag reader device 405, the tag reader device automatically reads information stored on the RFID tag using the antenna 415 and related wireless interface 414. The processor 411, under control of firmware stored in memory 410, for example, can execute steps to compare the information obtained from the RFID tag 401 to other information (e.g., tote destination data) already stored in memory 410, to determine whether the mail item 400 is being placed in the correct tote 404. If the processor 411 determines that the mail item 400 is not being placed in the correct tote 404, the processor can generate an alert by causing the indicator device 412 to provide some type of feedback to the sorting operator. For example, the indicator device 412 may include an LED that illuminates (e.g., turns red) in response to a potential mis-sort. The LED may be programmed to remain illuminated until the sorting operator pushes a button on the reader device 405 or it may be programmed to remain illuminated for a specified duration of time after a mis-sort is detected. Alternatively, the LED may flash, thereby providing the sorting operator with a more noticeable indication of a potential mis-sort. The indicator device 412 may also include a small audio component that beeps in response to a potential mis-sort. As will be obvious to one of ordinary skill in the art, any indication of a potential mis-sort may be provided in connection with the present invention.

In one embodiment, the tag reader device 405 may be configured to obtain a unique identifier from the RFID tag 401 associated with each mail item and compare it to a list of identifiers stored in memory 410. If the identifier obtained from the RFID tag 401 does not match an identifier in the list of identifiers stored in memory 410, the reader device 405 can be configured to provide a warning to the sorting operator of a potential mis-sort. Because the tag reader device 405 associated with each tote 404 is preferably read/write capable, a new list of identifiers (or other information) can be programmed onto the tag reader device before or during each use. This may occur, for example, via a wireless communication between the tag reader device 405 and the mailroom computer 418. The tag reader device 405 can also be configured to maintain a list of all mail items 400 that are placed in the tote 404. This information too can be communicated wirelessly to the mailroom computer 418 (or any other such host computer encountered during the mailing process). As described above, such information can be stored in a central database 16, preferably in association with tracking data indicating the status of the tote 404 during transport from the sender mailroom 220 to the delivery mailroom 320.

In another embodiment, the tag reader device 405 may be configured to compare destination indicia obtained from the mail item 400 with destination indicia associated with the tote 404, to determine whether the mail item is being placed in the correct tote. For example, a destination zip code, city or state of the mail item 400 may be compared to a destination zip code, city or state of the tote 404. In this case, if the processor 411 determines that the mail item 400 is not bound for the same overall delivery location as the tote 404, the tag reader device can again be configured to warn the sorting operator of a potential mis-sort. One of ordinary skill in the art will recognize that many other comparison techniques can be used as well.

Figure 23:
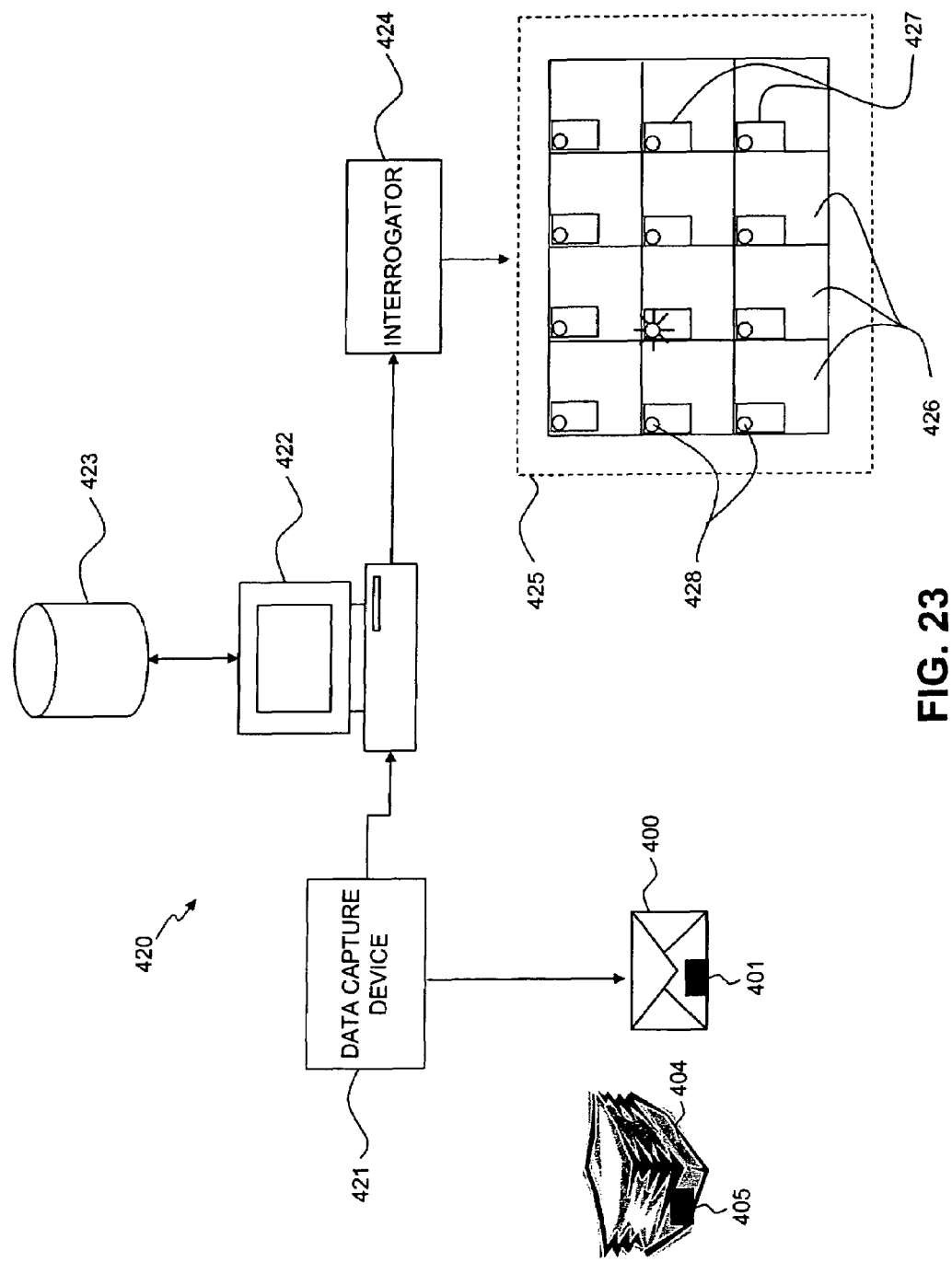
FIG. 23 shows one embodiment of a sort assist system that utilizes RFID technology to communicate sorting instructions to a sorting operator working at a destination location.

Automated sorting systems can also be implemented on the receiving end. For example, in one embodiment of the present invention, as illustrated in FIG. 23, a sort assist system 420 utilizes RFID technology to communicate sorting instructions to a sorting operator working at a destination location 300. Generally described, this embodiment includes a data capture device 421, a sort assist tool 422, a sortation database 423, an interrogator 424, and a sorting area 425 having a plurality of sort locations 426 with associated RFID tags 427, which may be passive or active tags.

The associated tags preferably have an incorporated LED 428 that illuminates when the tag communicates with the interrogator 424. Individual RFID tags 427 may be located using a preprogrammed RFID tag number that is associated with a sort location 426 by the sort assist tool 422. Alternatively, as will be recognized by those skilled in the art, individual RFID tags 427 may be distinguished using user-defined identifiers such as for example, a code or name associated with a sorting location 426.

Packages received at the delivery location 300, including totes 404, can be transported to a position proximate the sorting area 425, as shown. A sorting operator can use the sort assist system 420 to sort the individual mail items 400 contained in the tote 404. In one embodiment, the data capture device 401 captures a unique identifier (or other indicia) from the RFID label tag 401 associated with each mail item 400. Because the RFID label tag 401 may include a barcode and human readable indicia, as well as information stored on an RFID tag, the data capture device 421 may be a barcode reader, an RFID interrogator, an optical scanner or any other type of automated or manual data capture device known in the art. After capturing indicia from the RFID label tag 401, the data capture device 421 presents the data to the sort assist tool 422.

The sort assist tool 422 then queries the sortation database 423 and retrieves a sort location 426 associated with the mail item 400 and an RFID tag number that identifies the LED-equipped RFID tag 427 associated with the identified sort location. One of ordinary skill in the art will recognize that any number of hardware and software architectures can be used with the present invention to associate a mail item 400 with a sort location 426 and a sort location with an LED-equipped RFID tag 427. Once the sort assist tool 422 retrieves the RFID tag number or other indicia that identifies the LED-equipped RFID tag 427 associated with the sort location 426 for a mail item 400, the tool 422 passes the RFID identifier to the interrogator 424. In response, the interrogator 424 sends a signal to the LED-equipped RFID tag identified by that tag number and causes the tag to illuminate or turn on the associated LED 428.

The illuminated LED 428 provides a visual indication to an operator that identifies which of the plurality of sort locations 426 is the location where the mail item 400 should be placed. In one embodiment, the operator may notify the sort assist tool 422 that the mail item 400 has been placed in the appropriate slot by pressing a key on a keyboard in communication with the sort assist tool 422. Alternatively, the sort locations 426 may be equipped with conventional light curtains that are configured to send a signal to the sort assist tool 422 when the curtain is broken, as would occur once the mail item 400 is physically placed in the illuminated sort location. In still another embodiment, the LED 428 may be configured to turn off after a predetermined period of time.

As stated earlier, the RFID tags 427 preferably have an incorporated LED 428 that illuminates when the tag responds to a communication from the interrogator 424. Consequently, when the interrogator communicates with the tag identified by the sort instructions, the LED 428 on the tag illuminates and provides a visual indication of the appropriate bin, chute or conveyor belt (i.e., sort location 426) for the sorting operator. This visual indication allows the operator to identify at a glance the appropriate location for a mail item 400. The LED 428 may be programmed to illuminate only during communication or may remain illuminated for a specified duration after initial communication with the interrogator 424. Alternatively, the LED 428 may flash thereby providing a more noticeable indication of the sorting location 426 for the sorting operator. From this disclosure, it is apparent to one of ordinary skill in the art that any indication of a sortation location may be provided in connection with the present invention.

Figure 24:
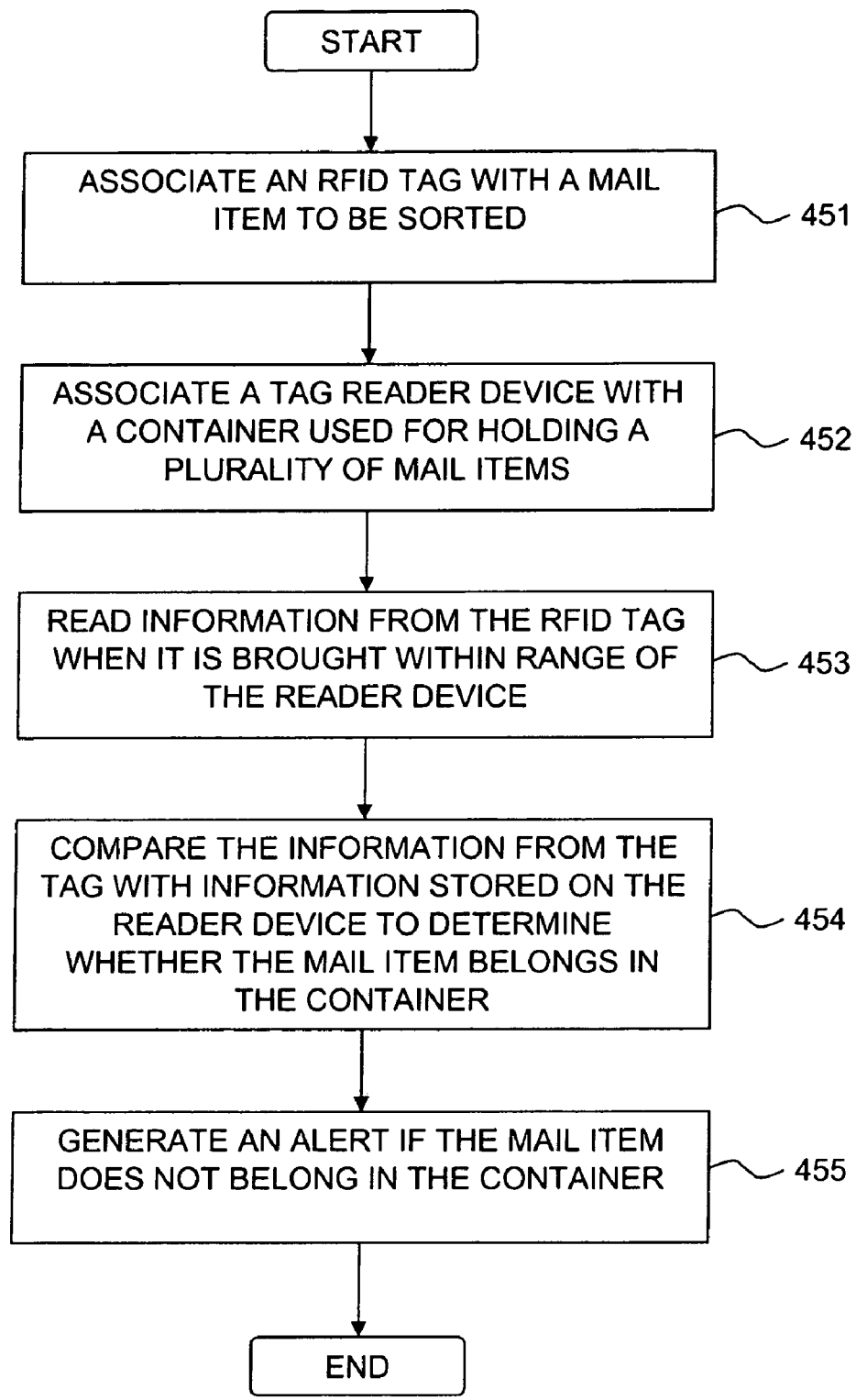
FIG. 24 shows a process flow diagram that illustrates a method of sorting mail items at a sender location in accordance with one embodiment of the present invention.

FIG. 24 shows a process flow diagram that illustrates a method of sorting mail items 400 at a sender location 200 in accordance with one embodiment of the present invention. The process begins at step 451 where an RFID tag 401 is associated with a mail item 400 that is to be sorted. In one embodiment, the RFID tag 401 is a passive RFID label tag, which can be generated by a user operating a sender computer 402 and related RFID label printer 403. The RFID label tag 401 preferably contains destination indicia and/or a unique identifier for uniquely identifying the mail item 400.

At step 452, a tag reader device 405 capable of reading information stored on the RFID tag 401, is associated with each tote or container 404 that is used for holding (or bundling) a plurality of mail items bound for a common delivery location. The tag reader device 405 can be any type of active RFID tag, portable reader, or other such device that is capable of interrogating the RFID tags 401, which are associated with corresponding mail items 400. In one embodiment, when a sorting operator brings a mail item 400 within range of a tag reader device 405, which is associated with a particular tote (or container) 404, the tag reader device, at step 453, automatically reads information from the RFID tag 401 associated with the mail item.

The process continues, at step 454, where the reader device 405 can be configured to automatically compare the information obtained from the RFID tag 401 with information previously stored or programmed onto the reader device, to determine whether the associated mail item 400 belongs in the selected container 404. If it is determined that the mail item 400 does not belong in the selected tote or container 404, then the reader device can generate an alert, at step 455, to notify the sorting operator that a potential mis-sort may be taking place. For example, the reader device 405 may include an LED that illuminates in response to a potential mis-sort being detected. The LED may be programmed to remain illuminated until the sorting operator pushes a button on the reader device 405 or it may be programmed to remain illuminated for a specified duration after the mis-sort is detected. In one embodiment, the reader device 405 may also include a small audio component that beeps in response to a potential mis-sort. As would be understood by one of ordinary skill in the art, the tag reader device 405 could also be configured to provide positive feedback, which indicates to the sorting operator that the mail item 400 is being placed in the correct tote or container 404.

Figure 25:
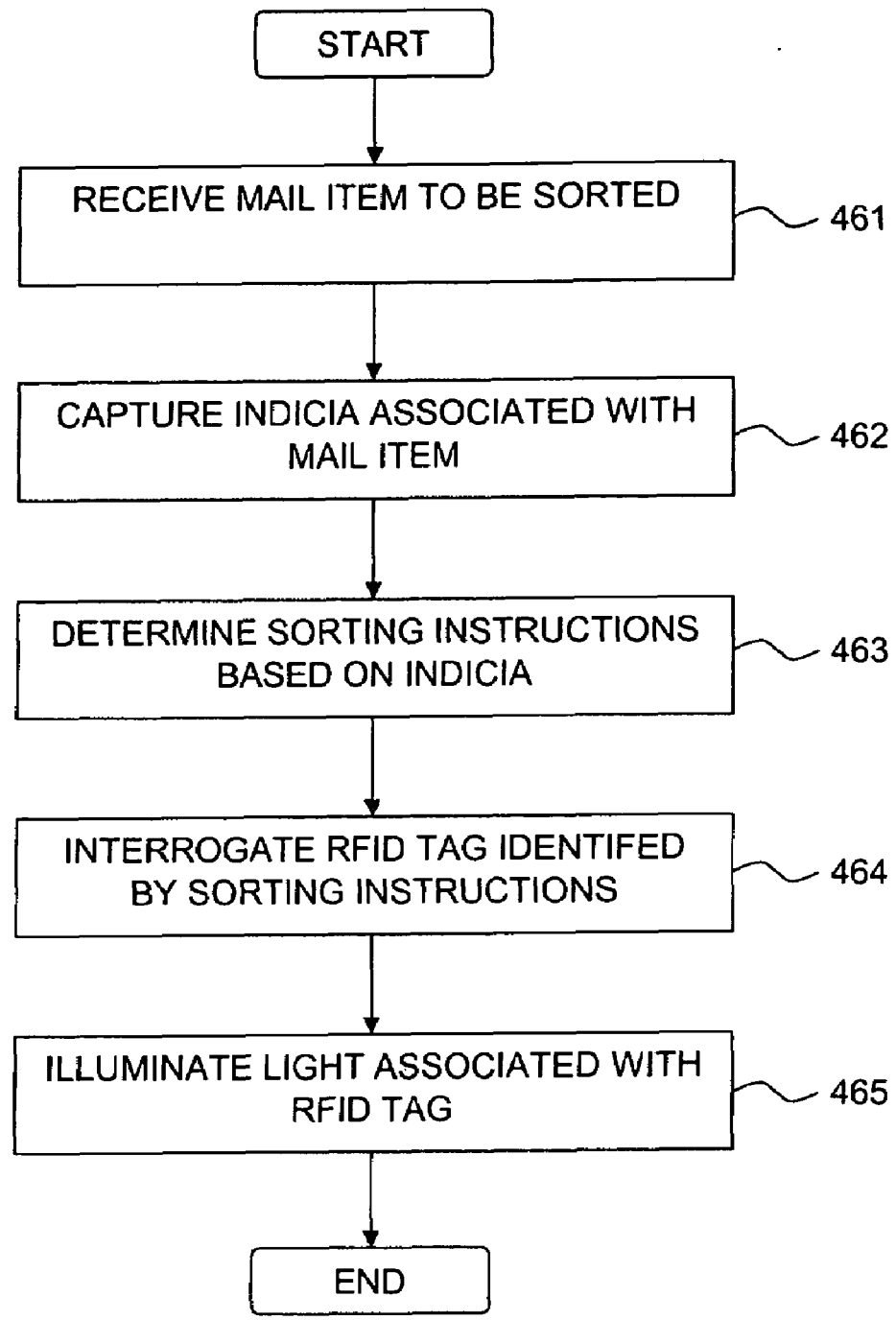
FIG. 25 shows a process flow diagram that illustrates a method of sorting mail items at a delivery location in accordance with one embodiment of the present invention.

FIG. 25 shows a process flow diagram that illustrates a method of sorting mail items 400 at a delivery location 300 in accordance with one embodiment of the present invention. The process begins at step 461 where a tote 404 containing a plurality of mail items 400 is received at a sorting area 425. In one embodiment, the tote 404 containing the plurality of mail items has been transported from a sender mailroom 220 to a receiver mailroom 320 by an external carrier such as UPS®, Inc.

At step 462, a data capture device 421 can be used to capture destination and/or identification indicia from a label or tag 401 associated with each item of mail 400 that is to be sorted to a bin, chute or conveyor belt (i.e., sort location 426), for distribution within the delivery location 300. Because the RFID label tag 401 may include a barcode and human readable indicia, as well as information stored on an RFID tag, the data capture device 421 may be a barcode reader, an RFID interrogator, an optical scanner or any other type of automated or manual data capture device known in the art. The captured data is communicated to the sort assist tool 422.

At step 463, the sort assist tool 422, using the captured indicia (e.g., a unique identifier), associates a sort instruction with the mail item 400. The sort instruction preferably includes an RFID identifier. Specifically, in one embodiment, the sort assist tool 422 queries a sortation database 423 and retrieves a sort location 426 associated with the mail item 400 and an RFID tag number that identifies an LED-equipped RFID tag 427 associated with the identified sort location. One of ordinary skill in the art will recognize that any number of hardware and software architectures can be used with the present invention to associate a mail item 400 with a sort location 426 and a sort location with an LED-equipped RFID tag 427.

After retrieving the RFID tag number (or other indicia) that identifies the LED-equipped RFID tag 427 associated with the sort location 426 for the mail item 400, the sort assist tool 422 passes the RFID identifier to the interrogator 424. In response, the interrogator sends a signal, at step 464, to the LED-equipped RFID tag 427 identified by the sort instructions, which, at step 465, causes the light associated with the RFID tag to illuminate. This light allows the operator to identify the appropriate sort location 426 for the mail item 400 at a glance.

A benefit of the systems and methods described above is that sorting efficiency and accuracy is no longer tied exclusively to the knowledge base of a sorting operator. Instead, mailroom personnel can simply sort the mail items 400 according to visual or audible indications provided by the RFID tags and other such devices and systems described above. Such visual or audible indications reduce the chance of sorting mistakes. Moreover, because sorting operations are no longer tied strictly to the knowledge-base of the operator, changes in sorting configurations can be made without requiring a significant learning curve. Accordingly, these systems and methods can enable an organization's mail system to operate in a more efficient and productive manner.

Many modifications and other embodiments of the inventions set forth herein will come to mind to one skilled in the art to which these inventions pertain having the benefit of the teachings presented in the foregoing descriptions and the associated drawings. For example, while embodiments described above disclose using the tag reader device on each tote or container to provide an indication of a mis-sort, it will be apparent to one of ordinary skill in the art that the RFID tag on each mail item could also be configured to generate such an alert. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for sorting mail items, comprising:
   a plurality of radio frequency identification (RFID) tags, wherein each said RFID tag is physically associated with a mail item to be delivered from a sender to a receiver;
   a plurality of containers, wherein each said container is used for holding a plurality of mail items destined for a common delivery location; and
   a plurality of tag reader devices, wherein each said tag reader device is physically associated with one of said plurality of containers, each said tag reader device being configured to:
      read first information from the RFID tag associated with each said mail item that is brought within range of said tag reader device;
      compare said first information from said tag with second information stored on said tag reader device;
      determine whether said mail item belongs in said associated container based on said comparing; and generate an alert if said determining indicates that said mail item does not belong in said associated container.

2. The system of claim 1, wherein said first information comprises a unique identifier that uniquely identifies the mail item brought within range of said tag reader device and said second information comprises a list of identifiers that identify a predetermined list of mail items that are to be placed in said associated container.

3. The system of claim 1, wherein said first information comprises destination indicia associated with the mail item brought within range of said tag reader device and said second information comprises destination indicia associated with said container.

4. The system of claim 1, wherein each said tag reader device is further configured to record a list of the mail items deposited in said associated container during a sorting process.

5. The system of claim 4, wherein said tag reader device is further configured to communicate said list of mail items to a host computer.

6. The system of claim 5, further comprising a database for storing said list of mail items in association with an identifier that uniquely identifies said container.

7. The system of claim 6, wherein said database further comprises tracking data generated in association with the transport of said container by a carrier to said common delivery location.

8. The system of claim 1, wherein the step of generating an alert comprises illuminating a light located on said tag reader device.

9. The system of claim 1, wherein the step of generating an alert comprises sounding an audible alarm.

10. The system of claim 1, wherein said tag reader device is further configured to generate a confirmation signal if said comparing step determines that said mail belongs in said associated container.

11. A method of sorting mail items, comprising:
associating a radio frequency identification tag with a mail item that is to be mailed from a sender to a receiver;
associating a tag reader device with a container that is to be used for holding a plurality of mail items destined for a common delivery location;
reading first information from the tag associated with said mail item when said mail item is brought within range of said tag reader device;
comparing said first information from said tag with second information stored on said tag reader device;
determining whether said mail item belongs in said container based on said comparing; and
generating an alert if said determining indicates that said mail item does not belong in said container.

12. The method of claim 11, wherein said first information comprises a unique identifier that uniquely identifies said mail item and said second information comprises a list of identifiers that identify a predetermined list of mail items that are to be placed in said container.

13. The method of claim 11, wherein said first information comprises destination indicia associated with said mail item and said second information comprises destination indicia associated with said container.

14. The method of claim 11, further comprising recording on said tag reader device a list of the mail items deposited in said container during a sorting process.

15. The method of claim 14, further comprising communicating said list of mail items to a host computer for storage in a central database, said list of mail items being stored in association with an identifier that uniquely identifies said container.

16. The method of claim 15, further comprising storing, in association with said container identifier, tracking data generated during the transport of said container by a carrier to said common delivery location.

17. The method of claim 11, wherein said radio frequency identification tag is embedded in a label that further comprises at least one of a barcode and human readable indicia.

18. The method of claim 11, wherein said step of generating an alert comprises illuminating a light located on said tag reader device.

19. The method of claim 11, wherein said step of generating an alert comprises sounding an audible alarm.

20. The method of claim 11, further comprising generating a confirmation signal if said comparing determines that said mail item does belong in is said container.

21. The method of claim 11, further comprising:
receiving said container at said common delivery location;
capturing indicia from a mail item removed from said container;
identifying a sort location based at least in part on said captured indicia;
communicating with a radio frequency identification tag associated with said identified sort location; and
responsive to said communication, illuminating a light associated with the radio frequency identification tag that is associated with said identified sort location.

22. The method of claim 21, wherein said step of identifying a sort location comprises identifying a unique radio frequency identifier of the tag associated with said sort location.

23. The method of claim 21, wherein said step of identifying a sort location comprises querying a sortation database based on said indicia captured from the mail item removed from said container.

* * * * *

UNITED STATES PATENT AND TRADEMARK OFFICE
CERTIFICATE OF CORRECTION

PATENT NO. : 7,278,568 B2
APPLICATION NO. : 11/173240
DATED : October 9, 2007
INVENTOR(S) : Kadaba It is certified that error appears in the above-identified patent and that said Letters Patent is hereby corrected as shown below:

Column 9,

Line 20, "At step S10" should read --At step S110--.

Signed and Sealed this

Nineteenth Day of August, 2008

JON W. DUDAS
*Director of the United States Patent and Trademark Office*